United States Patent [19]

Kaneko et al.

[11] Patent Number: 5,306,889
[45] Date of Patent: Apr. 26, 1994

[54] WIRE CUT ELECTRICAL DISCHARGE MACHINING APPARATUS

[75] Inventors: Yuji Kaneko; Hideo Nishimura, both of Fukui, Japan

[73] Assignee: Sodick Co., Ltd., Yokohama, Japan

[21] Appl. No.: 982,750

[22] PCT Filed: Jul. 3, 1991

[86] PCT No.: PCT/JP92/00844
§ 371 Date: Apr. 15, 1993
§ 102(e) Date: Apr. 15, 1993

[87] PCT Pub. No.: WO93/01017
PCT Pub. Date: Jan. 21, 1993

[30] Foreign Application Priority Data
Jul. 5, 1991 [JP] Japan ............................... 3-165915

[51] Int. Cl.$^5$ .................................................. B23H 7/04
[52] U.S. Cl. .................................................. 219/69.12
[58] Field of Search ............... 364/474.04; 219/69.12, 219/69.13, 69.17, 69.19

[56] References Cited

U.S. PATENT DOCUMENTS

| | | | |
|---|---|---|---|
| 4,329,558 | 5/1982 | Martin | 219/69.12 |
| 4,559,432 | 12/1985 | Itoh | 219/69.12 |
| 4,575,605 | 3/1986 | Martin | 219/69.12 |
| 4,652,717 | 3/1987 | Briffod et al. | 219/69.12 |
| 4,675,491 | 6/1987 | Marendaz | 219/69.12 |
| 4,691,089 | 9/1987 | Balleys | 219/69.12 |
| 4,963,711 | 10/1990 | Obara | 219/69.12 |

FOREIGN PATENT DOCUMENTS

| | | | |
|---|---|---|---|
| 53-64899 | 6/1978 | Japan . | |
| 69-29230 | 2/1985 | Japan . | |
| 61-288931 | 12/1986 | Japan | 219/69.13 |
| 62-15017 | 1/1987 | Japan . | |
| 62-54626 | 3/1987 | Japan . | |
| 3-86427 | 4/1991 | Japan | 219/69.19 |

OTHER PUBLICATIONS

Japan Society of Electrical-Machining Engineers, vol. 23/No. 45, Dec. 1989, pp. 22-28—"Obara, et al.".
Japan Society of Electrical-Machining Engineers, vol. 24/No. 47, Nov. 1990, pp. 12-22—"Obara, et al.".

Primary Examiner—Geoffrey S. Evans
Attorney, Agent, or Firm—Marks & Murase

[57] ABSTRACT

An apparatus for a wire cut electrical discharge machine for preventing breakage of the wire electrode during machining, and thereby increasing machining performance. Since wire electrode breakage accidents during machining are often the result of a concentration of spark discharges in the machining area, the present invention controls machining conditions to prevent wire electrode breakage by detecting any continuous generation of spark discharges in a specific zone of the machining zone and discriminating normal concentration phenomenon from a truly bias sparking condition based on the position of the detected sparks. Appropriate control over the machine or machining conditions to relieve the problem may be exerted in response to a detected biased spark discharge condition. A biased spark discharge condition is detected and discriminated when spark discharges continue to occur within a set bias area, defined as a predetermined area which is set around the position of a spark discharge. If subsequent spark discharges are detected outside the bias area, then a non-biased state is determined and a new bias area is set. Thereafter, this procedure is repeated.

45 Claims, 12 Drawing Sheets

WIRE CUT ELECTRICAL DISCHARGE MACHINING APPARATUS

TECHNICAL FIELD

The present invention relates to a wire cut electrical-discharge machining apparatus having a spark-status detector for detecting any bias in spark discharge positions, thereby preventing the wire electrode from breaking during wire cut electric discharge machining. The present invention also relates to a wire cut electrical discharge machining apparatus having a device for detecting a condition, such as a concentration of spark discharges, indicative of an impending wire electrode breakage and, more specifically, to a device for generating signals indicative of a biased discharge state. The present invention also relates to a device for measuring the break limit of a wire electrode from the conditions which gave rise to the formation of the detection signals indicative of a biased spark discharge or spark concentration.

BACKGROUND

A wire cut electrical discharge machining apparatus is an apparatus designed to use a thin wire of about 0.05 to 0.35 mm$\phi$ in diameter as an electrode tool. The wire is held in tension between a pair of positioning guide members which permit renewal of the wire electrode in the work zone by allowing movement of the electrode wire in its axial direction while maintaining a predetermined tension on it. During normal machining, the wire electrode approaches the workpiece to be machined at approximately a right angle with respect to the axis of the wire electrode, while maintaining a very small machining gap between the workpiece and the wire electrode. Machining is done by generating spark discharges on an intermittent basis. The discharges are generated by applying periodic voltage pulses across the working gap between the wire electrode and the workpiece under conditions where a working fluid fills the working gap. In such an apparatus, the machining feed device causes relative movement between the wire electrode and the workpiece as machining progresses. Unless otherwise prevented by suitable machining condition settings and control of working conditions, machining may be interrupted as a result of wire electrode breakage. Some recent arrangements for dealing with wire electrode breakage include self-recovery devices, such as, for example, a function which automatically joins broken wire electrode ends or otherwise rethreads the electrode through the workpiece. Such joining or rethreading functions are not necessarily 100 percent successful and, in any event, even if successfully accomplished, are not only wasteful of time, but also generally impair machining accuracy and the like. It is, therefore, preferable to avoid wire breakage. However, to do so in the context of prior art wire cut electrical discharge machines creates other problems. In order to machine accurately and with high performance, i.e., efficiently and at higher machining speed, working conditions, and in particular machining voltage pulse width and off time duration, mean amplitude of the discharge current, and machining feed control, must be established and controlled so that the machining is done under heavier load conditions at which there is a higher risk of wire breakage. Moreover, it is impossible to carry out precision machining wherein the wire electrode is highly tensioned without risking wire breakage, unless the machining is done at relatively low efficiency working conditions.

There are various causes of wire electrode breakage. However, wire breakage during machining may, to some extent, be avoided by detecting spark conditions, and controlling the working conditions to light-load conditions if a concentration of spark positions is detected; in other words, a condition where the sparks are only partially distributed along a limited area of the machining gap. Wire electrode breakage due to causes such as spark concentration may be avoided through the use of gap condition detection and adaptive control based on that detection. Appropriate detection, for the purpose of preventing wire electrode breakage, requires detecting the position of the sparks being generated within the working segment of the wire electrode, i.e., the length of wire electrode between the electrical feed or contact pieces positioned on both the upper and lower sides of the workpiece, and especially along the spark-generating portion of the wire electrode, i.e., the axial portion of the wire electrode which defines the machining gap between the wire electrode and the workpiece, and varyingly and responsively controlling the working conditions in accordance with the positions at which spark discharges are generated each time a machining pulse, in the form of a voltage impressed across the machining gap, is generated or in accordance with the position of a sampling of spark discharges from each machining pulse. The detection should be able to determine whether the spark discharge positions are concentrated or not to thereby determine whether conditions which may result in breakage of the wire electrode are present. In other words, the detection should be capable of discriminating whether the spark discharge positions are concentrated or only partially distributed along the wire electrode. Such detection may involve detection of spark discharge positions generated within a predetermined period of time or within predetermined numbers of spark pulses.

Most known detectors of concentrated spark conditions for conventional wire cut electrical discharge machining apparatus indirectly estimate the spark discharge positions according to parameters, such as different spark conditions, in an effort to discriminate a concentrated spark discharge situation from a normal one. For example, according to Laid-Open Japanese Patent Application No. 53-64899, spark discharge positions are detected or measured in an essentially indirect manner by providing a voltage measuring circuit in which fluctuations in electric resistance between an electrical contact point (of the wire electrode) and the sparking point is determined by measuring the voltage therebetween.

Further, according to Laid-Open Japanese Patent Application No. 59-30620, wire breakage prevention is attempted by detecting the value of the current flowing into the upper and/or lower electrical feed or contact pieces, extracting a signal indicative of a changing rate of current flowing into the feed contact pieces from the current detection signal, comparing the current rate change with a predetermined value in order to attempt to determine conditions wherein sparks are concentrated at or nearly the same location on the workpiece, and then resetting the working conditions in response to the detected signal. However, in accordance with this technique, the correlation between the moving speed of the sparking position on the wire electrode and the wire traveling speed is not taken into account and, therefore, the detection of a concentrated sparking condition at the same point on the wire electrode is not possible. In Laid-Open Japanese Patent Application No. 62-54626, the moving speed of the sparking position on the wire electrode and the traveling speed of the wire electrode are detected and when both speeds are almost coincident for more than the predetermined period of time, a concentrated sparking condition detection signal is delivered.

According to the above-stated disclosures and the like, even if the spark discharge positions could be detected or measured with some accuracy, questions remain about spark concentration, methods of discriminating between partially distributed and concentrated spark discharge positions, determination of criterion for discrimination, and the like. Therefore, the present state of the art is not yet effective for practical use.

For example, in the '620 Laid-Open Application the arrangement is such that a spark discharge position signal is detected for every voltage pulse (specifically, the machining current in the electrical feed or contact piece circuit is detected while machining voltage pulses are in a gate-off condition, the value held in a sample-hold circuit, and the value taken as a digital value using an A/D converter), and is compared with the value of the previous spark pulse to detect any difference (by using an arithmetic unit or digital comparator) and, if there is a difference, a difference signal is delivered. Every time the spark discharge position signal is output, the output is integrally counted. When a predetermined set number n is counted, the count of the counter which delivers a varying control signal for setting working conditions, is reset by the difference signal. The count is set using, for example, a preset counter. Conditions for difference detection and the values used, such as the number of times the difference detection delivers the reset signal, is carried out and the set number n for the said preset counter can be freely regulated and set by experience, data and theory, according to selected, predetermined working conditions and machining objectives. However, the machining efficiency is poor under settings which usually overemphasize safety, while smaller safety margins may result in accidental breakage of the wire electrode. Therefore, in practice, operation at preferable settings adapted to individual working conditions are not attained, and the resulting situation is impractical.

In addition, in practical usage, the spark discharge position detection apparatus according to the '620 Laid-Open Application, does not detect spark position with satisfactory accuracy levels.

Similarly, the use of means, such as a difference amplifier, as disclosed in Laid-Open Japanese Patent Application No. 62-15017, for spark discharge position detection does not provide sufficient accuracy as is needed to effectively prevent wire electrode breakage without adversely affecting other aspects of machining performance.

Also, with regard to the disclosure of the '626 Laid-Open Application, if there is a concentration of sparks attributable to chips and/or other foreign matter which has adhered to or become fixedly stuck on the surface of the wire electrode, it can be detected as is disclosed. However, in practice, such a situation is not usually a problem encountered during machining. Today, when machining under usual working conditions, the situation where the traveling speed of the wire electrode has to be used as a parameter for control is unusual. For example, machining is typically carried out using an electrode renewal feed rate of about 3 to 8 m/min for a brass wire electrode of between about 0.2 and 0.3 mm in diameter. Of course, this feed rate may vary depending on the wire electrode material and diameter and other working conditions. Different feed rates and wire electrode material may be used. Assuming conditions such as voltage pulse ON time of about 1 $\mu$s or less, about 4 to 10 $\mu$s of quiescent (or off) time between sparking pulses, a sparking current of about 10 to 15A, and a machining speed of between about 100 and 170 $mm^2$/min, then about 1000 voltage pulses are supplied and impressed between the wire electrode and the workpiece while the wire electrode moves by about 1 mm. Therefore, the appropriate detection strategy is to first detect the spark concentration conditions at locations adjacent to the initial spark discharge position, as opposed to tracing the spark discharge positions on the wire electrode, and then carrying out discrimination. In addition, if the period of concentrated spark duration times is in the range of 50 ms to several 100 ms, as discussed in the '626 Laid-Open Application, the wire electrode would move axially by between about 5 mm and several 10 mm in the time frame of interest. However, the number of machining voltage pulses detected in that time frame (to be used as discrimination data) will be approximately between 50,000 to several 100,000 pulses. From a practical standpoint, it would be difficult to use such a number as a set count number for the counter 34 and/or to determine a suitable frequency setting of the clock pulse generator 3 corresponding to predetermined wire cut spark machining conditions.

The present invention is based in part on a recognition that the spark discharge conditions in a wire cut electrical discharge machine during various machining modes, such as the advancing mode in machining, is roughly as follows.

The wire electrode moves on a renewing feed basis between a pair of contacted positioning guides, while experiencing oscillations (sometimes including superimposed higher oscillations) whose characteristics depend on such parameters as the material, diameter, distance between guides, wire tension, etc. Other oscillations, which are restricted by machining conditions imposed on the traveling portion of wire electrode, e.g., such as where the wire passes through the narrow groove inside which the working fluid is positioned, also exist. Under conditions where intermittent voltage pulses are impressed across the machining gap between the wire electrode and the workpiece, as indicated above, with the wire approaching the workpiece at machining speeds as indicated above, an intermittent sparking pulse of approximately 10 kHz to several 10 kHz on the average is initiated across the machining gap, e.g., where the wire and workpiece are in closest proximity or where foreign matter causes light spark conditions, giving rise to the characteristic EDM sparking. If everything is operating normally, the spark discharges resulting from those sparking pulses move at random along the axial direction of the wire electrode, i.e., along the thickness of the workpiece, as machining progresses. The workpiece is thus subjected to even and equally distributed spark discharges. When sparks start to occur at the same proximate location as a preceding spark, after some time interval additional chips, gas, bubbles, and the like, intervene around the sparking point as a result of the sparks. Assuming an arbitrary number of voltage pulses successively supplied and impressed across the machining gap at a frequency of up to approximately 100 kHz (e.g., using the energy formula disclosed in Laid-Open Japanese Patent Application No. 44-13195, and assuming a spark discharge takes place almost at the instant the voltage pulses are initiated, the sparking frequency and machining pulse frequency will be almost the same), usually several pulses will strike a succession of sparks at or near the same sparking point (of course, not all successive voltage pulses will strike sparks in other (i.e., distributed) locations, and some voltage pulses create no sparks at all). A condition whereby a slight concentration of sparks at or near one location may develop.

Oscillations of the wire electrode may be present from other causes. However, the gap is more likely to expand locally due to influences such as the pressure from the spark discharges and the produced gas, chips and the like which tend to diffuse and move to the circumference. As a result, as described above, most spark discharges take place in the gap at other locations and, as described above, as machining is carried out, the spark discharges move tend to to other locations immediately or after striking some arbitrary number of sparks.

Therefore, it is difficult to discriminate an undue spark concentration conditions based on the exact position of the detection of spark discharges and the procedure of processing multiple spark discharge position detection signals. The above description concerns the case where the machining gap and machining conditions are normal.

As alluded to above, detection of concentrated spark discharge conditions avoids problems. It should be appreciated that there are some cases where the cause is unknown and concentrated sparks cannot be detected. However, situations such as where the machining feed rate increases beyond the normal rate or where the workpiece is thicker in comparison to machining under the normal spark condition as described above, or where there is a deficient or unsuitable supply of working fluid in the gap due to a change in taper angle or when machining around a corner part of a profile configuration to be machined, or where foreign matter or the like adheres to the wire electrode or a local part of the workpiece, or where an overheated spot is created, all may lead to breakage of the wire electrode. Other causes may be a location in the gap wherein several sparks occur and which is not relieved of the arc-like discharges but instead develops short circuit, or where sparks are produced as a result of a machining spark phenomena in a certain location, which, for some reason becomes arc-like. Then, sparks in that location may continuously repeat for a period several times longer than that associated with the slight concentration of sparks which occurs during normal machining. In some cases, the result is an arc-like concentration of sparks leading to breakage of the wire electrode.

OBJECTS AND SUMMARY OF THE INVENTION

Accordingly, in view of the foregoing problems, in order to prevent the wire electrode from breaking while machining, it is a general object of the present invention to provide a spark-status detector capable of detecting a condition such as a partially distributed spark discharge positions by detecting the axial position along the wire electrode of the spark discharges every time a spark discharge pulse occurs, and preferably by accurately detecting the axial position of the spark discharges.

It is a further object of the present invention to provide a wire cut electrical discharge machining apparatus arranged so that, based on the above signal, a biased status detecting signal is generated to discriminate whether a condition which is likely to result in a concentration of sparks is present or impending. Then, based on the discrimination signal, machining conditions may first be varied to an extent whereby the machining load is slightly reduced without unduly reducing machining efficiency, and further, based on the spark concentration condition of the discrimination signal, determination may be made as to whether a break limit condition, which is likely to cause breakage of the wire electrode, is present. Further, based on the discrimination signal, parameters such as the working conditions can be controllably varied to conditions inconsistent with wire electrode breakage.

In order to attain the above, as well as other objects and advantages, a wire cut electrical discharge machining apparatus according to a first inventive aspect of the present invention may comprise a spark machining status detector for a wire cut electrical discharge machine, wherein a travelling wire electrode is renewed by feeding the wire electrode in its axial direction under conditions where the wire electrode is contacted by upper and lower electrical contact members, each disposed on an opposite side of the workpiece to be machined, and by guide members. Machining is accomplished by spark discharges generated by a voltage pulse periodically impressed across a working fluid filled machining gap formed between the workpiece and the wire electrode in the region between the guide members. The position at which spark discharges are generated, or the position of spark pulses sampled in a predetermined manner, may be detected. In this arrangement a current comparator may be used to detect the current flowing into one or both of the electrical contact members due to spark discharges generated as a result of the impression of the machining voltage pulses. A spark-position detecting means amplifies output signals from the current comparator(s) and outputs a signal indicative of the axial position of the spark along the wire electrode between the electrical feed members. A digital data arithmetic unit converts the output signals from the spark position detecting means into digital data indicative of the axial position of the spark discharges along the wire electrode. A spark-status detector delivers a biased spark position signal when the digital data, indicative of the spark discharge positions output by the arithmetic unit, indicates that the spark discharges in the machining gap during machining are within a range below an upper limit value and above a lower limit value (of digital values) and in a predetermined spark discharge position bias range. The detector delivers a spark-position dispersion signal when the output digital data for spark discharge positions are above the upper limit value or less than the lower limit value (of digital values) in the predetermined spark discharge position bias range and simultaneously sets upper and lower limit values of a new spark discharge positions bias range, including digital data values for the spark discharge positions.

In order to deductively increase the detecting accuracy of the spark discharge positions in the spark-status detector, it is preferable to include an arrangement comprising upper and lower peak holding circuits for detecting and holding the peak currents detected by the upper and lower current comparators every time a spark discharge is created. A difference amplifier may be used as the spark-position detecting means for extracting the difference between peak-point currents latched by the peak holding circuits and for outputting a signal indicative of the spark position. In order to accomplish such detection within a short time after the termination of the gate signal of the sparking pulse, when converting output values from the difference amplifier into digital data indicative of the spark position each time a spark occurs, a delay timing circuit for the gate termination signal may be included in the arithmetic unit for indicating spark discharge positions.

In addition, it is preferable to arrange the spark-status detector so that in use, the accuracy of detecting the spark discharge positions does not decrease or vary as the predetermined electrical machining conditions are changed. When the spark position signal obtained through the difference amplifier is supplied to the arithmetic unit, those signals are converted into digital data indicative of the spark discharge position. The degree of amplification of the circuit for amplifying the spark position signal may vary according to the predetermined machining conditions such as those relating to the width or duration of a machining pulse, and it is preferable to allow for alteration by a setting.

In addition, as a preferred embodiment of a bias spark position status detector in a spark-status detector, it is preferable to include an addition and subtraction unit for adding and subtracting pre-selected digital data to the digital data indicative of the spark discharge position which is delivered from the arithmetic unit, and for setting the spark discharge position bias range to be within a sufficiently small data width as compared to the digital data corresponding to the workpiece thickness; the data width having upper and lower limits predetermined by the above preselected addition and subtraction data. Using digital data for an output spark discharge position as a reference, comparators may be used to compare digital data for the spark discharge positions output by the arithmetic unit for each spark pulse with the upper and lower digital data values in the above-noted predetermined spark discharge position bias range. A logic circuit compares the outputs from both comparators after a delay timing signal every time a sparking pulse occurs and delivers a spark position bias signal when the output spark discharge position data from the arithmetic unit is over the lower limit and below the upper limit of the spark discharge position bias range, while delivering a spark position dispersion signal when the spark discharge position data is below the lower limit and above the upper limit. The upper and lower digital data for the predetermined spark discharge position bias range are reset to allow the bias range to be updated by the digital data for the spark discharge position of the sparking pulse.

In addition, a wire cut electrical discharge machining apparatus according to a second embodiment of the present invention may comprise, as part of the foregoing first device, a discrimination device having a counter which receives as input the spark position bias signals and spark position dispersion signals. The counter is arranged so that it integrally counts the bias signals but also clears the count of the integrated bias signals in response to the input of a dispersion signal. A discriminator delivers a spark concentration foreseeing status discrimination signal [SIG 1] as a display, warning, discriminating, or a machining condition control signal when the integrated count of the bias signals exceeds a set value.

Further, a wire cut electrical discharge machining apparatus in accordance with a third embodiment of the present invention may comprise, in the foregoing second device, a break limit discriminator for the wire electrode which is based on one or both of the duration time and frequency of occurrence of the foreseeing status discrimination signal [SIG 1] (delivered by the spark concentration foreseeing status discriminator). The break limit discriminator for the wire electrode detects the duration time of the discrimination signal every time the foreseeing status discrimination signal is entered, produces a duration limit signal [SIG-W] when the duration time of the discrimination signal input reaches a set time limit value, produces a generation time limit signal [SIG-N] when the foreseeing status discrimination is counted a predetermined number of times (set in advance) within a preset sampling time, and delivers a limit discrimination signal [SIG 2] for machining condition control, which includes a signal for stopping machining in response to both or either one of the duration limit signal and generation time limit signal.

Further, when carrying out the third embodiment formed with the wire electrode break limit discriminator, it is preferable to provide an arrangement comprising a reset means for the wire electrode break limit discriminator, for counting the generation time of the foreseeing status discrimination signal so that the duration time range does not reach a set limit [A>B-W] until a new limit output signal is detected and delivered after the limit signal [SIG-W] is output from the duration limit signal generator. The signal hold of the duration limit signal [SIG-W] previously delivered is released when the count reaches a required set value. Also, a signal [SPCK 1], which is delivered during each of the above required sampling times, is counted until a new limit signal [SIG-N] is produced, when the count of the foreseeing status discrimination signal does not reach the predetermined value within the required sampling time (set in advance) after the output of the limit signal [SIG-N] from the generation time limit signal generator. A hold signal for the generation limit signal previously delivered is released if the count reaches a predetermined value, and cancels the limit discrimination signal [SIG 2] for machining conditions control.

DETAILED DESCRIPTION OF PRESENTLY PREFERRED EMBODIMENTS

Figure 1:
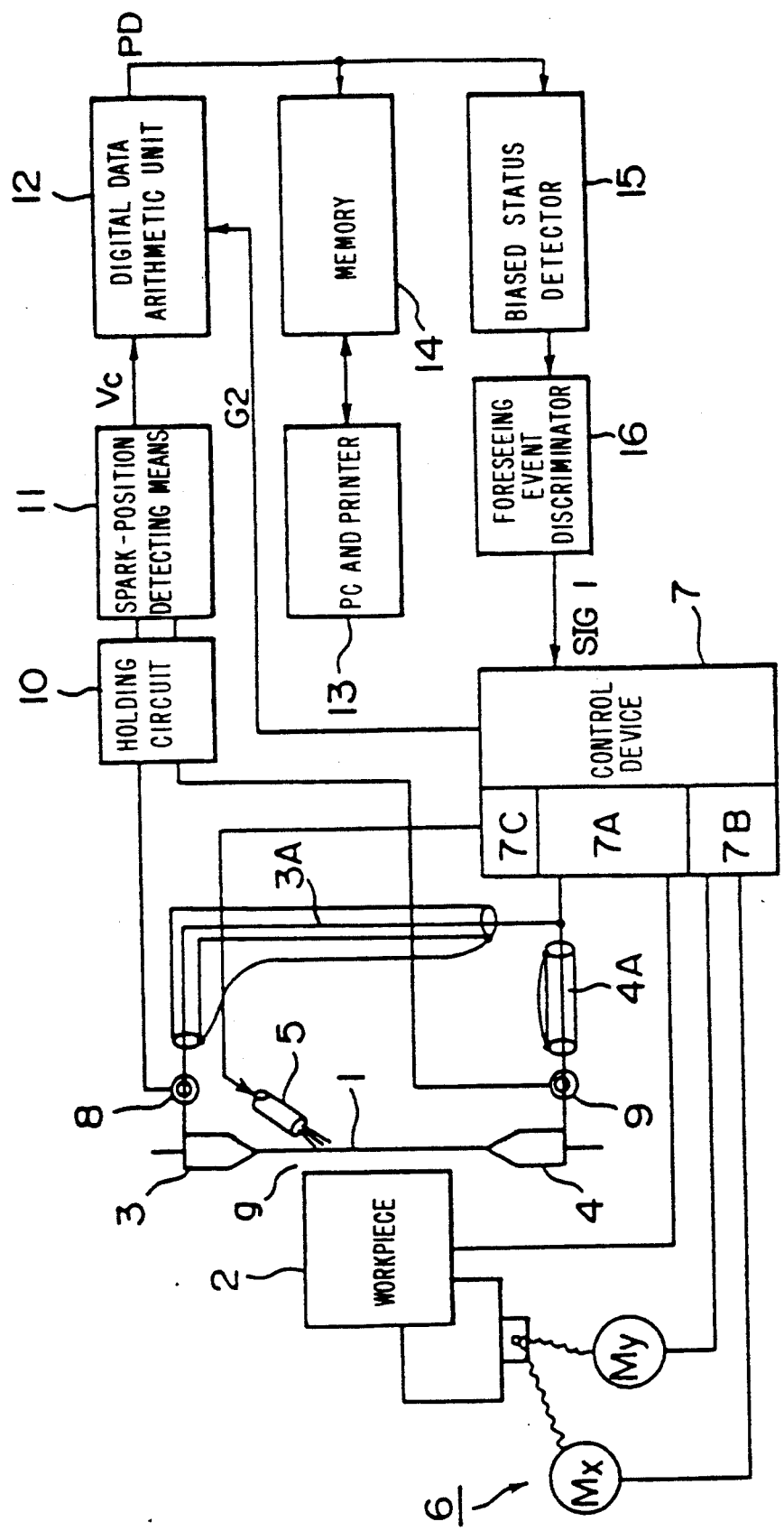
FIG. 1 is a block diagram representing the general arrangement of an embodiment which may be used in connection with the first and second aspects of the present invention.

The invention will now be described in detail with reference to an example for carrying it out as follows:

FIG. 1 is a block diagram representing an embodiment including first and second aspects of the present invention. Reference numeral 1 designates a wire electrode travelling on a renewing feed basis in the axial direction under conditions where a predetermined tension is applied to the wire in the space between positioning guides 3 and 4 (the guides are positioned at certain distance from each other). Machining is carried out on the workpiece 2 from a direction at almost right angles to the axial direction of the electrode across a space which comprises a very small gap g. Voltage pulses are supplied and impressed across the workpiece 2 and the wire electrode 1 from the wire cut electrical discharge machining power supply 7A (FIG. 2) through upper and lower interpole lines 3A and 4A and upper and lower electrical feed members 3 and 4. A working fluid fills and flows through the said gap g, and may be introduced by means of a nozzle 5 for causing a jet of working fluid to flow towards the gap g. The voltage pulses generate intermittent sparking pulses across the fluid filled gap. A relative machining feed movement between the wire electrode and the workpiece, in a plane generally perpendicular to the axis of the electrode, is accomplished using a feed mechanism 6 having axis feed motors Mx and My for causing movement in the X-Y directions, respectively. Reference numeral 7B represents a machining feed drive circuit. Reference numeral 7C represents a working fluid supply circuit, and reference numeral 7 is a wire cut electrical discharge machining control device incorporating a NC unit which controls systems such as the power supply 7A and the circuits 7B and 7C. The control device 7 may be used to make settings, to change settings, and to control parameters, such as, for example, to establish machining conditions, input programs, and generate various control signals, etc. Reference numerals 8 and 9 represent upper and lower current detectors for detecting discharge currents supplied through the feed members 3 and 4 to the wire electrode 2 at the terminal ends of the upper and lower interpole lines 3A and 4A at the time the spark discharges are generated. Reference numeral 10 represents a pair of holding circuits to which the detected signals of the current detectors 8 and 9 are input. Usually, a sample and hold circuit is used to activate the holding circuit 10 so that, for example, the detected signals are latched by synchronizing the detected current signal to the termination of spark pulse gate signals. Presently, the most desirable embodiment of the holding circuits 10 of the invention is that of a peak holding circuit (e.g., FIG. 3) formed to latch the voltage corresponding to the peak point of the detected current signals. Reference numeral 11 represents a spark position detecting means for amplifying the output signals from the current detectors 8 and 9, or the output of holding circuit voltages, furnished as described above, and for outputting an amplified signal corresponding to the position along the axial direction of the wire electrode between the pair of electrical members 3 and 4 of a spark discharge. When a pair of detectors (i.e.. upper and lower current detectors 8 and 9) are used, the arrangement will also include a difference amplifier (e.g., FIG. 4) for differentially amplifying both of the detected signals or both of the holding signals. Reference numeral 12 represents a digital data arithmetic unit (e.g., FIG. 4) for converting spark discharge position signals amplified by the spark position detecting means 11 into digital data, e.g., eight-bit digital data, as its output. Reference numeral 14 represents a memory unit for storing the digital data PD of spark discharge positions output by the arithmetic unit 12. Reference numeral 13 represents a PC with printer for carrying out the required operation and processing of the digital data stored in the memory 14 in response to the operator control and, as required, for generating an output such as a hard copy. Reference numeral 15 represents a bias spark position status detector (e.g., FIG. 9) for discriminating spark positions, such as a biased spark condition (inside or outside the biased range) or a dispersion spark condition, based on the digital data PD delivered from the arithmetic unit 12. Reference numeral 16 represents a spark concentration foreseeing status discriminator (e.g., FIG. 9) for generating an output, such as a display, a warning, a discrimination or machining condition control signal, e.g., [SIG 1], in response to the frequency of occurrence of a biased spark signal delivered by the bias status detector 15 as a discriminated result. Also, the control device 7 includes a NC unit for receiving the spark concentration foreseeing status discrimination signal delivered by the discriminator 16, and for carrying out a first level of control, for example, in order to slightly reduce the mean machining current and/or machining feed rate, or to slightly increase the jetting pressure and flow rate of working fluid, and thereafter monitor any changes in machining conditions. Accordingly, the control device 7 may control one or more of the wire spark machining power supply 7A, machining feed drive circuit 7B, and working fluid supply circuit 7C.

Figure 2:
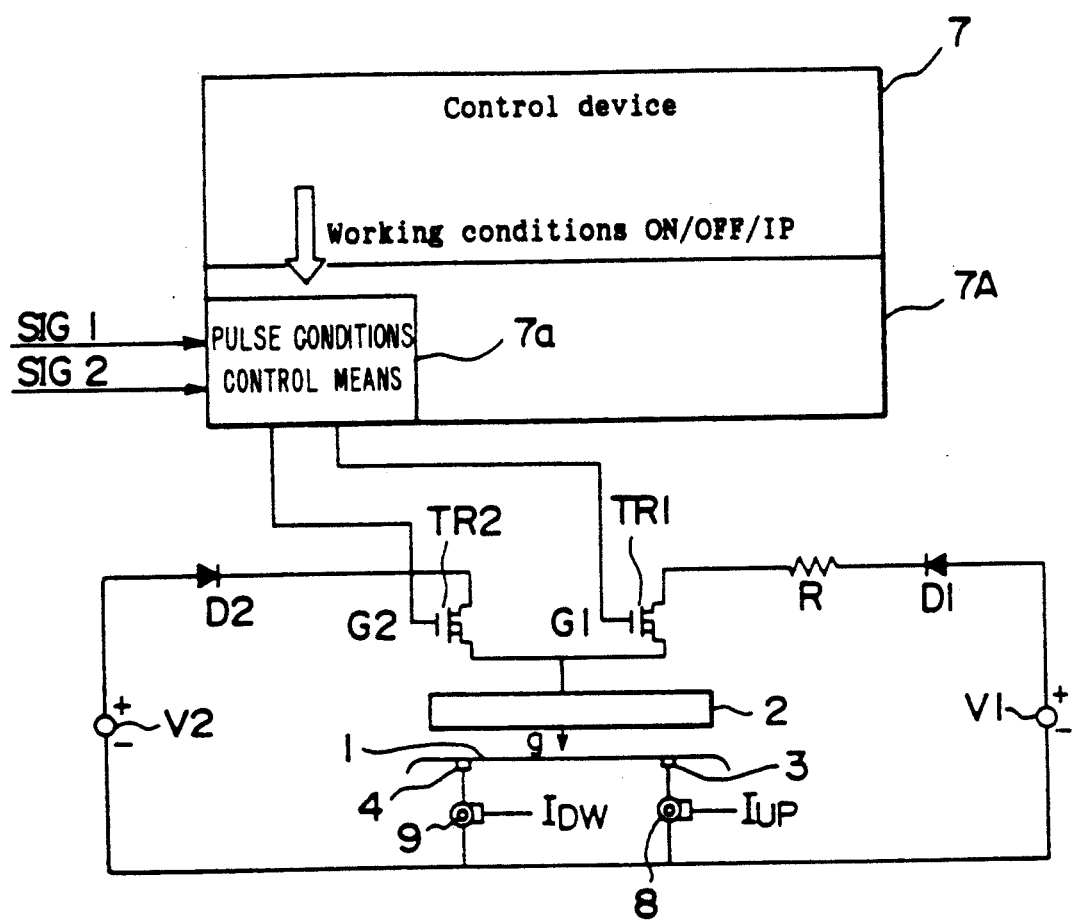
FIG. 2 is an illustration of the circuit connections for the power system 7A and a control device 7 for the wire spark machining device of FIG. 1.

As an example of the wire cut electrical discharge machining power supply 7A, FIG. 2 illustrates an example of a double pulse supply system having a high voltage, small current, and a low voltage, large current power source. The double pulse power supply of FIG. 2 includes an auxiliary source V1 of high voltage and small current, for example, of 300 volts, or thereabout and a main source V2 for providing a low voltage, large current for machining. For example, a voltage of about 100 volts may be used. Reference numerals D1 and D2 represent reverse current protection and steering diodes, respectively, and R is a current limiting resistance. Switches TR1 and TR2 are on-off switching elements for the auxiliary supply V1 and main supply V2, respectively, and may consist of switches such as MOS-field-effect transistors. Signals G1 and G2 are input gate signals to the switching elements TR1 and TR2, respectively. Signals G1 and G2 are input to the gate terminals of the switching elements TR1 and TR2, respectively, from a pulse condition setting and control means 7a in the machining power supply 7A, and is set and controlled by the wire spark machining control device 7 which also encompasses the above-noted NC control device. The switches TR1 and TR2 are used to supply a voltage or machining pulse having desired polarity, voltage, machining pulse duration, quiescent time, and current amplitude between the wire electrode 1 and the workpiece 2.

Figure 3:
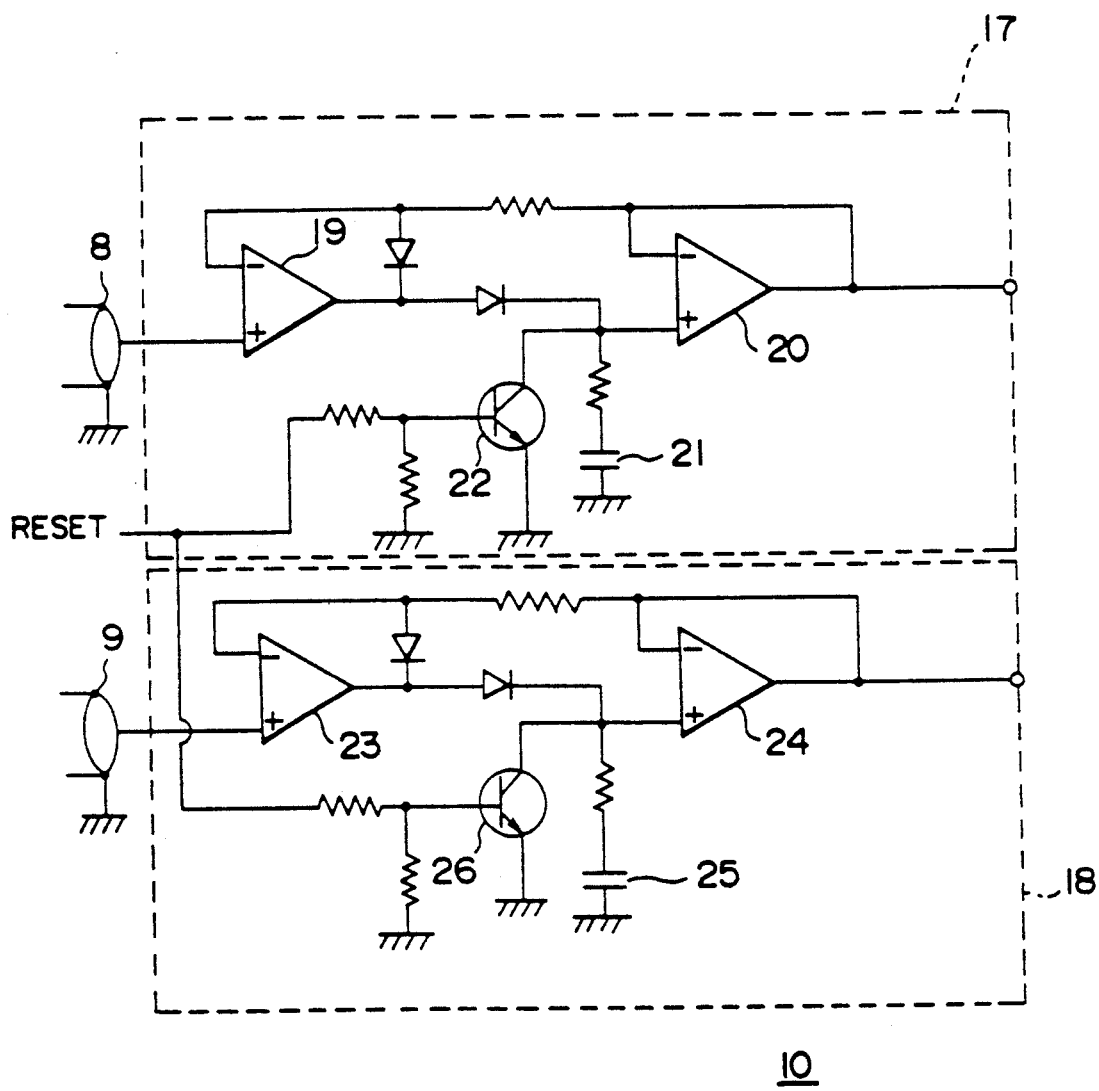
FIG. 3 is an illustration of a peak holding circuit as an example of a holding circuit which can be used with the circuit of FIG. 1.

FIG. 3 illustrates an example of a preferred embodiment of a peak holding circuit for the sample and hold circuit 10 for the detected signals emanating from the current detectors 8 and 9 and positioned between the current detectors 8 and 9 and the spark position detecting means 11. The sample and hold circuit delivers a spark position signal to the spark position detecting means 11 after amplifying the detected current signals. The illustrated embodiment comprises upper and lower peak holding circuits 17 and 18 for the current detectors 8 and 9, respectively, which contemplates detection at both the upper and lower electrical feed members as a preferred mode of carrying the invention into practice. The above-noted peak holding circuits 17 and 18 each comprise holding capacitors 21 and 25, two operational amplifiers 19/20 and 23/24, and reset transistors 22 and 26, Wherein reset signals are entered for discharging held charges on the capacitors 21 and 25 to reset the circuits.

Figure 4:
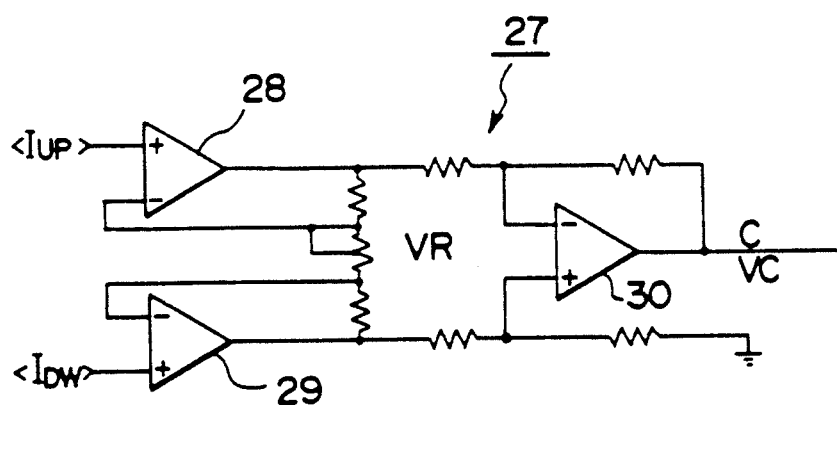
FIG. 4 is an illustration of the circuit connections for the parts of a difference amplifier used as the spark position detecting means 11 and the digital data arithmetic unit 12 for spark discharge position detection in the circuit of FIG. 1.
Figure 4:
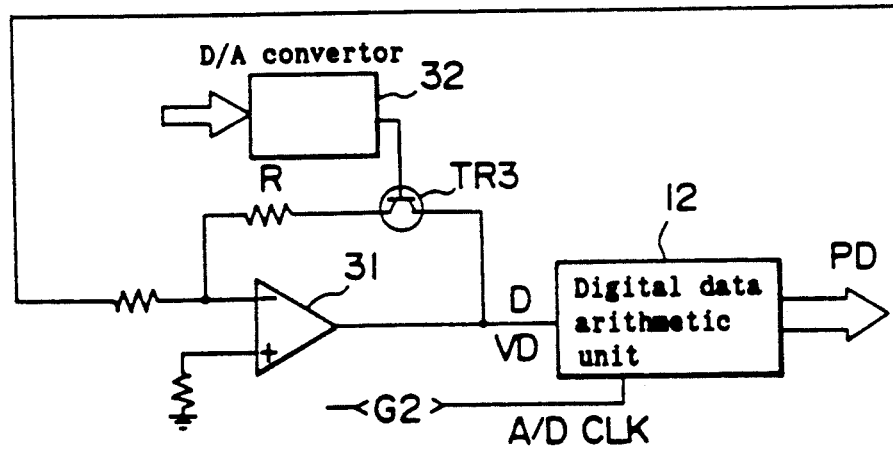

FIG. 4 illustrates a circuit diagram of an embodiment of the spark position detecting means 11 in which the signals from the holding circuits 17 and 18, which comprise the current signals detected by the current detectors 8 and 9, which have been latched and held and then amplified to deliver a spark position signal according to the detected spark position. FIG. 4 further includes, in block diagram representation, the digital data arithmetic unit 12 for generating a spark discharge position signal. As an embodiment of the detecting means 11, FIG. 4 illustrates, as an example, the use of a difference amplifier 27, as the amplifier preferred in the case where current detection is done at both upper and lower electrical feed members, this being the preferred mode of carrying out the invention into practice. In the difference amplifier 27, operational amplifiers 28 and 29 receive upper and lower detected current signals $I_{UP}$ and $I_{DW}$, respectively, and the outputs of the amplifiers 28 and 29 are input to a difference amplifier 30 and amplified after regulating the difference ($I_{UP}-I_{DW}$) between the detected current signals [see FIG. 5(f)]. The difference signal ($I_{UP}-I_{DW}$) is virtually zero when a spark discharge takes place at the midway position of the wire electrode 1, i.e., midway between the upper and lower feed members 3 and 4 and against the workpiece 2. In any case, a spark position signal VC is delivered. The arithmetic unit 12 receives the spark position signal VC and converts the signal to digital format by A/D conversion. Thus, an analog spark position signal, corresponding to the difference between the detected current signals, is output in digital form by converting the analog signal VC into digital form, e.g., into an eight-bit digital data PD. In the illustrated embodiment, the spark position signal VC is arranged so that a signal VD, regulated to the machining conditions, is input into the arithmetic unit 12 through an amplifier circuit having an amplification factor which varies inversely with respect to certain machining condition parameters such as machining voltage or spark pulse width (time). The amplifier circuit may comprise an operational amplifier 31 for inverted amplification of the signal VC, a transistor TR3 inserted in a feedback circuit of the amplifier 31 to convert and regulate the amplification factor, and an A/D convertor 32 for supplying signals to the transistor TR3 so that the amplification factor of the amplifier circuit varies inversely with respect to predetermined machining conditions, such as the machining voltage or spark pulse width. The gate signals to TR3 are counted and an analog signal is output by the convertor 32. One reason the amplifier circuit is so arranged is that, with wire cut electrical discharge machines and the associated electrical machining condition parameters, the possible current amplitude, which is set or is a consequence of the parameter setting, is significantly large in relation to the set or desired voltage spark pulse width and/or time. The result is that the waveform of the sparking current will be generally triangular and as a rule the spark current will not rise to or exceed the predetermined value under the voltage and spark pulse width settings usually set as machining conditions. Therefore, as described in connection with FIG. 5, by differentially amplifying the difference between the detected current signals ($I_{UP}-I_{DW}$) in a spark position detecting means 11, without more, it would not be possible to distinguish between detected spark positions for different voltage or spark pulse width settings.

Figure 5:
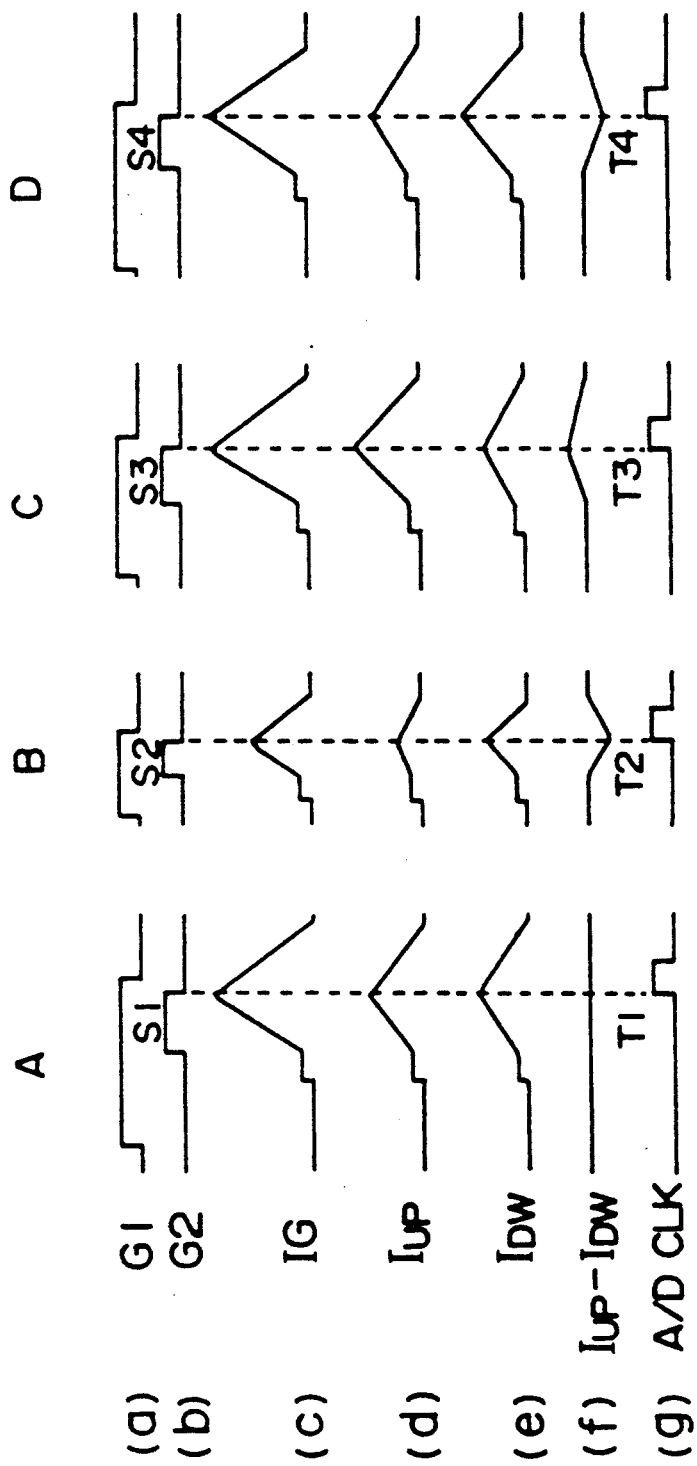
FIG. 5 represents input/output voltage and current waveforms and a timing chart for individual signals in circuits in FIGS. 1 through 4; columns A, B, C and D illustrate situations where the width of a gate signal G2 differ and also where discharge conditions differ.
Figure 6:
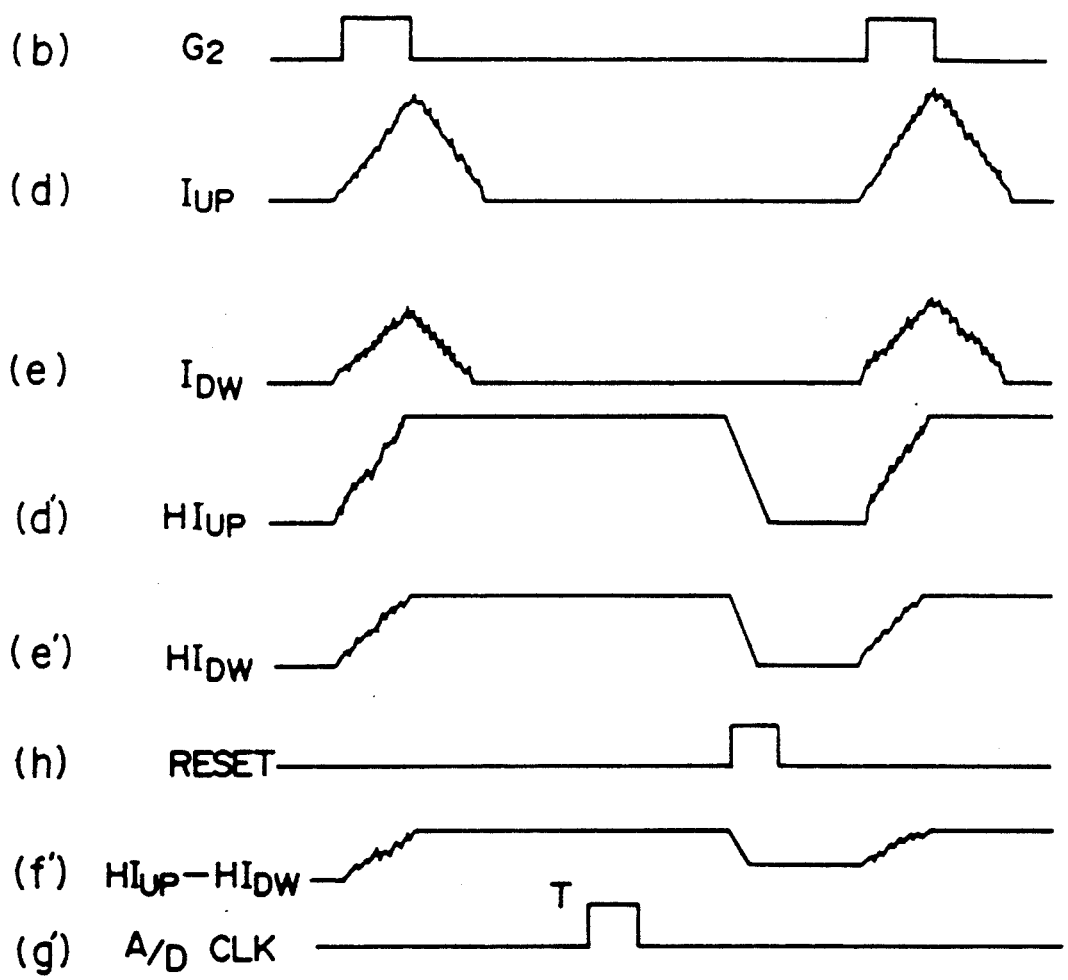
FIG. 6 is a waveform and timing chart similar to FIG. 5, and includes a diagram illustrating use of a peak-holding circuit.

FIGS. 5 and 6 are charts illustrating signals such as input/output voltages, current waveforms and timing signals for individual parts of the block diagrams and circuits of FIGS. 1–4. FIG. 5 illustrates waveforms in the embodiment where the holding circuit 10 is not used, while FIG. 6 shows waveforms in the embodiment where peak holding circuits, such as the circuits 17 and 18 in FIG. 3, are used as the holding circuit 10. FIG. 5, columns A, B, C and D illustrate different cases of the voltage or spark pulse gate signal. In columns A, C and D, the gate signals (b) G2 have the same pulse width, i.e., for A, C and D (S1=S3=S4). Column A represents the case where the current difference signal, row (f) ($I_{UP}-I_{DW}$)=0. Column C represents the case where the current difference signal results in a positive value. Column D represents the case where the current difference signal results in a negative value. Column B represents the case where the gate signal row (b) G2 is less than S1 (=S3=S4). In other words, the width of the machining pulse is narrow, such as may be the case where conditions are set for higher precision machining.

In FIG. 5, the signal G1 of row (a) illustrates the gate signal for the switching element TR1; signal G2 of row (b) illustrates the gate signal for the switching element TR2; the signal IG of row (c) illustrates the waveform of the spark discharge current ($I_{UP}+I_{DW}$); signal $I_{UP}$ of row (d) illustrates the upper detected current signal flowing from the sparking point to the workpiece 2 through the wire electrode 1 from the upper electrical feed member 3 that is detected by the upper current detector 8; signal $I_{DW}$ of row (e) illustrates the lower detected current signal; current difference signal $I_{UP}+I_{DW}$ of row (f) illustrates the difference between the upper and lower detected signals; and signal A/D(CLK) of row (g) illustrates the timing pulse generated simultaneously with the termination or turning off of the gate signal G2 and also permits the digital data arithmetic unit 12 for the spark discharge position to perform the arithmetic operation of converting the incoming signal VC into digital data VD.

Columns A, C and D illustrate the case where machining is carried out under conditions where the same value is set for the machining voltage or the width of the spark pulse. The spark of column A is taken to be a spark discharge fired at the workpieces from a location on the wire electrode midway between the above-noted feed members 3 and 4 by the deficiency in the detection signals, i.e., row (f) ($I_{UP}+I_{DW}$); in reality the probability is that the location is slightly above or below the midpoint, as against right at the midpoint, as the detect ion signal has been regulated by the variable resistance VR of the difference amplifier 27. The sparks illustrated in columns C and D occur, respectively, above and below the midpoint. The spark positions can be checked by monitoring the digital data PD, as converted and computed by the arithmetic unit 12.

Figure 7:
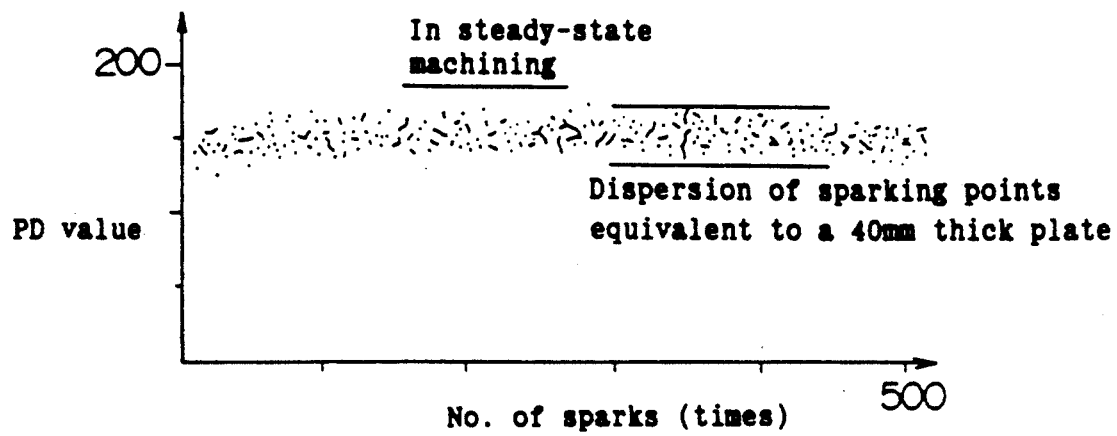
FIG. 7 is a chart illustrating a time distribution characteristic of a digital data values PD of spark discharge positions during steady machining.
Figure 8:
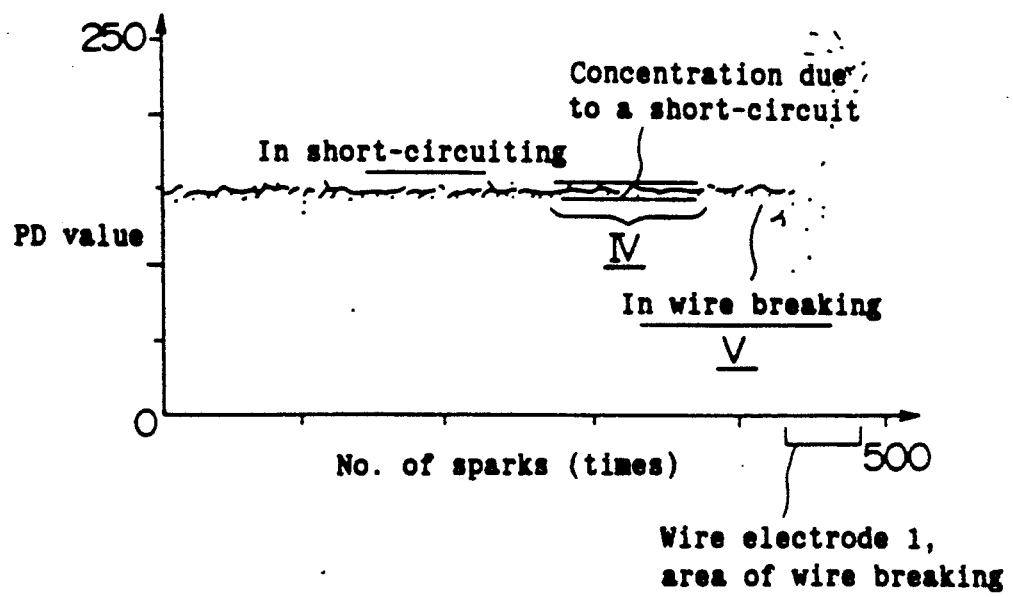
FIG. 8 is a chart illustrating a time distribution characteristic of digital data values PD of spark discharge positions during short circuiting or during a period where there is a concentration of spark discharges.

FIGS. 7 and 8 are charts which illustrate characteristic digital data PD for spark discharge positions output every time a spark pulse is created as described above, or based on the spark pulses sampled as necessary, for example, one out of every three pulses. In either case, in FIG. 7 it is assumed that a 40 mm thick workpiece 2 is being machined. In the case of FIG. 7, the data can be classified as indicating steady-state machining. In FIG. 8, the data can be classified as machining under non-steady-state conditions, such as short circuiting, concentrated spark discharges and wire breakage. The graph charts graduated digital data values (A/D converted spark discharge position signals PD) from the arithmetic unit 12 vertically against a number of sparks (=time) horizontally. As will be clear from the chart, during steady machining (FIG. 7), there is almost no concentration of sparks, and over the passage of machining time, the plotted points of spark positions are random and almost evenly scattered and distributed over the whole thickness of the workpiece 2 in the axial direction of the wire electrode 1. In the case of a short circuit, or just before breaking of the wire electrode 1, or where the spark discharges tend to concentrate at a location (FIG. 8), the plotted points of spark positions concentrate at a location of a short circuit point along the plate thickness (40 mm) of the workpiece 2. Moreover, despite the existence of a partial scattering to the perimeter, the plotted points are linearly intermittent along the time base. If this spark distribution continues, a point V where the wire electrode 1 breaks, will result. In advance of that breakage, a concentrated linearization of plotted points as seen in part IV of FIG. 8, may appear. When the wire electrode 1 has broken, its ends will come in contact with the workpiece 2 and other electrically conductive structures and will strike sparks. Thus, as illustrated in FIG. 8, on wire breakage the position of spark points may extend in the axial direction of the wire electrode 1 beyond the plate thickness of the workpiece 2. According to the invention, by providing an arrangement whereby the spark discharge positions can be detected and distinguished with high accuracy, the ability to detect and anticipate a break of the wire electrode I can also be realized.

FIG. 6 is a waveform chart illustrating the case where the peak holding circuit (FIG. 3) is used as the holding circuit 10 for detecting current signals between the current detectors 8 and 9 and the spark discharge detecting means 11, as described above. In FIG. 6, $HI_{UP}$, row (d'), is a peak holding waveshape of the upper detected currents. Similarly, $HI_{DW}$, row (e'), is a lower peak holding waveshape. A signal equivalent to the peak value of detected current signals is held until the RESET signal, row (H), is delivered. The difference signal $HI_{UP}-HI_{DW}$, row (f'), is differentially amplified, and a time setting pulse T, row (g'), delayed with respect to the time of gate G2, as shown in FIG. 5, is delivered at the time the peak holding difference signal is amplified to allow the digital data arithmetic unit 12 to carry out its conversion operation to output the digital data PD. As described above, when, under predetermined machining conditions, the voltage or spark pulse is set relatively wide with respect to the amplitude of the spark current, and the amplitude of spark currents IG, row (c), of FIG. 5, increased to its predetermined maximum value by the end of the pulse width, there is of course no need to delay the set time of the pulse T as described above.

Further, with regard to obtaining the digital signal VD from the spark position signal VC, the analog signal VC in FIG. 4 is regulated by a variable gain inversion amplifier, consisting of the operational amplifier 31 and other components. For example, comparing the spark resulting from a short gate signal (column B of FIG. 5) and the spark resulting from a longer gate signal (column D of FIG. 5), the difference of detected current signals are nearly equal: $B(I_{UP}-I_{DW})=D(I_{UP}-I_{DW})$. The signal VC is the signal amplified by the difference amplifier 27 of the spark position detection means. When that signal is converted into the digital data PD by the arithmetic unit 12, the possibility of detecting sparks occurring at the same position is high. However, in response to the upper detected current signal $I_{UP}$, row (d), and lower detected current signal $I_{DW}$, row (e), of individual sparks, the ratio of upper ($I_{UP}$) to lower ($I_{DW}$) is 1:2 for the spark in column B and 2:3 for the spark in column D. They are recognized as sparks in different positions, at approximately 67 percent and 60 percent, respectively, of the plate thickness of the workpiece 2 as measured from the workpiece bottom. Thus, there is provided an arrangement as described above, wherein the internal resistance of the transistor TR3 is controlled to obtain the amplified and regulated signal VC which is then converted into digital data indicative of spark positions.

Figure 9:
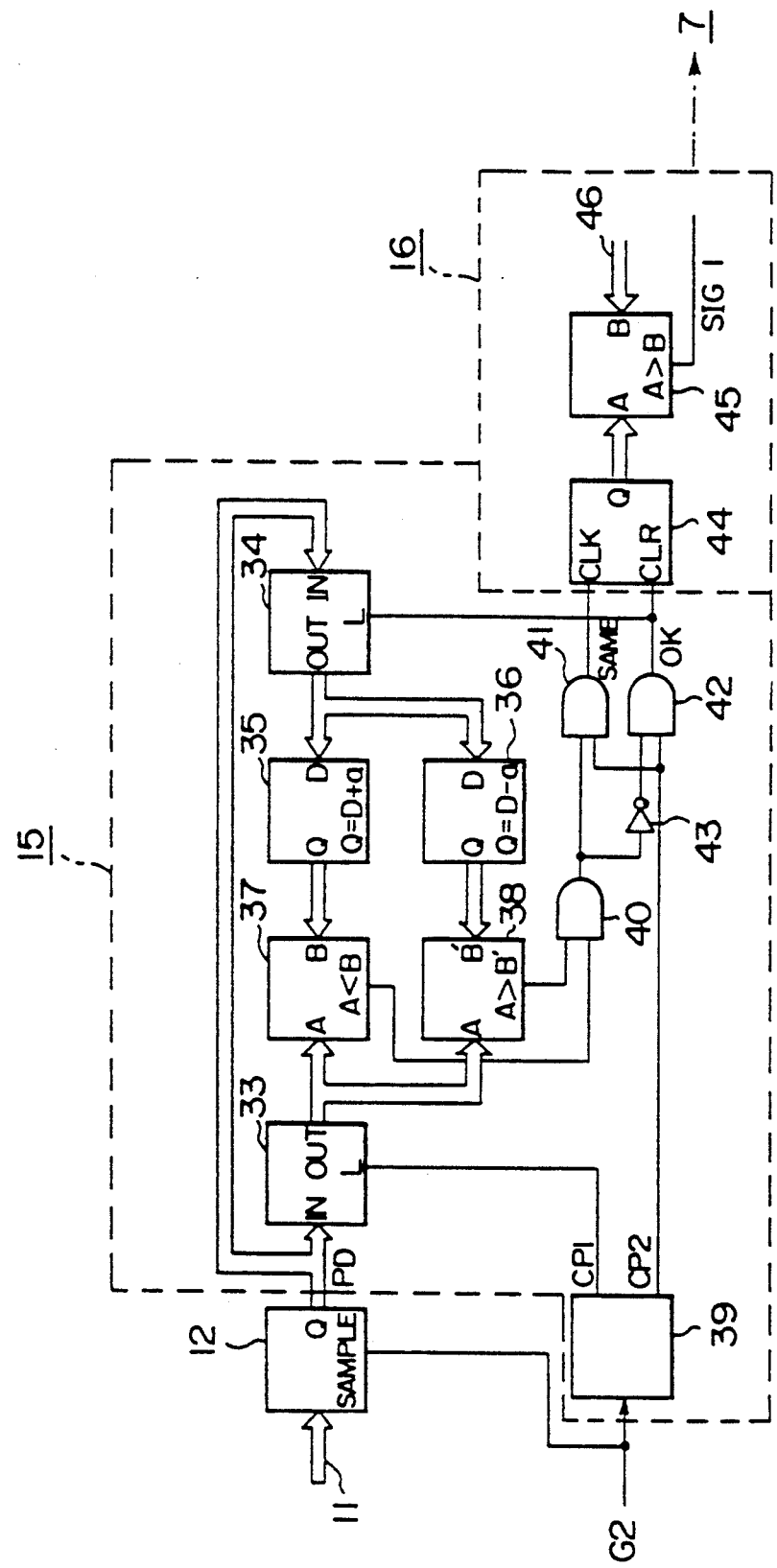
FIG. 9 is a block diagram representing the general arrangement of a bias spark position status detector 15 and a spark concentration foreseeing status discriminator 16.

Next, as alluded to above with regard to FIG. 9, there is depicted a spark status detector 15 for detecting the position of each spark pulse or sampled spark pulse, and based on conversion of the position information to digital data PD, the spark status detector 15 determines whether the spark discharge positions are in a biased condition. Also depicted in FIG. 9 is a discriminator 16 that outputs a signal to carry out a first control, e.g., to repeatedly monitor any detected bias condition and to discriminate as to the nature of any spark concentration so as to foresee a wire break condition and to signal the wire spark machining control device 7, for example, to increase the quiescent (or off) time of the voltage pulses to slightly decrease the machining mean current and, when a detected partially distributed spark condition returns to normal, to discontinue such control.

The bias spark position status detector 15, in the illustrated embodiment, may comprise first and second latching circuits 33 and 34 to the which digital data from arithmetic unit 12, indicative of spark location, is input; adjustable counters 35 and 36 for presetting the upper and lower limits of the bias range by receiving an output latch signal from the second latching circuit 34, and first and second comparators 37 and 38 for comparing spark position data (A) for the updated spark pulse position, as delivered from the first latching circuit 33, with the upper and lower limit position data (B) and (B') for the bias area or range as set in the adjustable counters 35 and 36. A delayed timing pulse generator 39 synchronizes the closing of the gate signal, the turning on of the timing pulse T, and the like. The pulse generator 39 outputs a timing pulse CP1 in the form of a latch command to the first latching circuit 33, simultaneous with the closing of gate signal G2 or turning on of timing pulse T, and also outputs a delayed timing pulse CP2, slightly delayed with respect to the end of timing pulse CP1, to a logic circuit which receives the signal output by virtue of the compared result from the two comparators 37 and 38. The logic circuit compares the above signals upon occurrence of the delayed timing pulse CP2 and delivers a bias status detection signal SAME if the above generated position is within the predetermined bias area or range. If the generated position is outside of the bias area or range, the logic circuit delivers a spark position dispersion signal OK. The logic circuit incorporates three AND-gates 40, 41 and 42 and one invertor circuit 43. In addition, the broken-wire-electrode discriminator 16 comprises a counter 44, wherein the bias status detection signal SAME is entered at the count terminal and the dispersion signal OK is entered at the reset terminal. The output terminal of the counter 44 delivers the current count of the signal SAME to a comparator 45, which outputs a spark concentration foreseeing status discrimination signal SIG 1 to the machining control device 7 when the output count of the counter 44 exceeds the predetermined value B set in the comparator 45. A comparative value adjuster 46 for adjusting the value of B is not illustrated.

Figure 10:
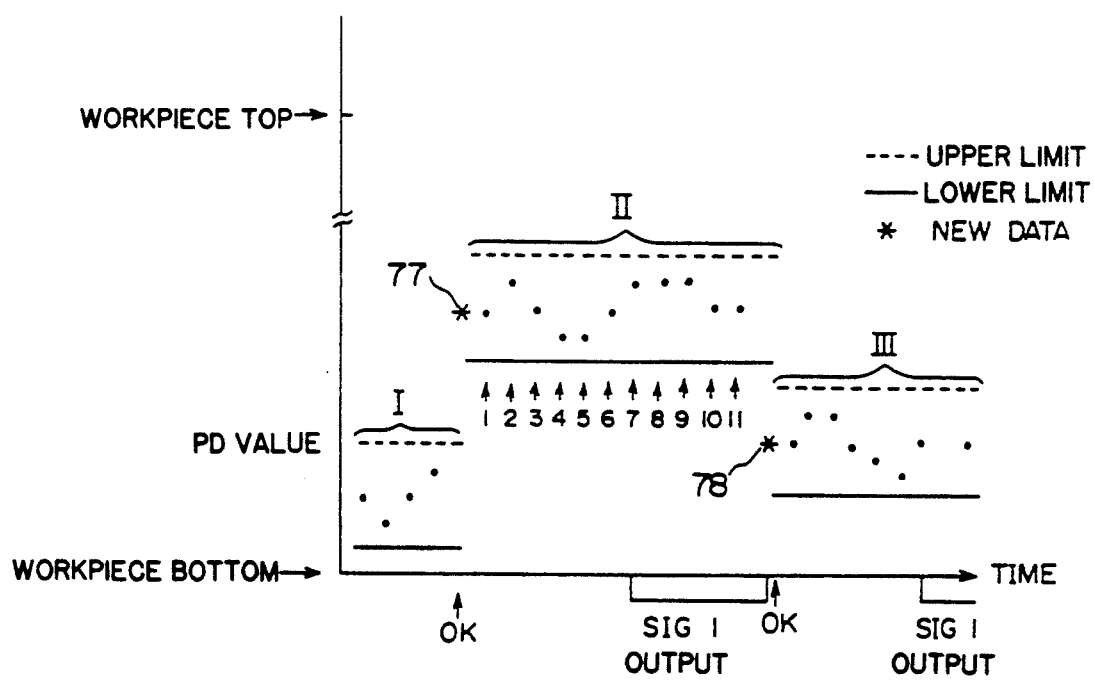
FIG. 10 is a descriptive chart for explaining the mode of carrying out the detection of a bias status of sparking positions and the foreseeing status discrimination of spark concentration according to the circuit means in FIG. 9.

FIG. 10 is a chart for describing various modes carrying out the bias status detection of spark positions and the foreseeing status discrimination of spark concentration according to the circuit of FIG. 9. The horizontal axis reflects increasing time and the digital data PD indicative of the spark positions along the workpiece thickness, as output by the arithmetic unit 12, is plotted vertically. Bias ranges for spark discharge positions, separated into predetermined machining time zones I, II and III, are represented by broken and solid lines for upper and lower limits, respectively. Data plots marked with an asterisk (*) at reference points 77 and 78 in the ranges II and III represent digital data for initial spark positions relating to the settings for those ranges. In the illustrated example, the comparative set number of the comparator 45 for delivering a spark concentration foreseeing status discrimination signal SIG1 is 6.

The upper and lower limit position data, (B) and (B') respectively, for setting the upper and lower limit adjusters 35 and 37 for the bias range, is shifted when the digital data value of a new spark discharge position from the discharge condition digital data values of PD, as plotted in the range I, goes to the value marked with an asterisk (*) at reference point 77, which is outside the upper and lower limit values for the range I. A spark position dispersion signal OK is output by the AND-gate 42 by the signal indicative that the spark discharge position is outside of the range I during the delayed timing pulse CP2. The dispersion signal OK is output to the counter 44 to reset the count value therein and also to the second latching circuit 34 to latch the digital data value 77 which is output from the arithmetic unit 12 and which is marked with an asterisk (*) in FIG. 10. The latch data value 77 is then entered into the adjustable counters 35 and 36. When the new data value 77 is entered in the adjustable counters 35 and 36, the data value (a) is added to the count set in adjuster 35 and subtracted from the count set in adjuster 36 to set the bias range II to have the required width, $2a$, (which should be small in comparison to a typical plate thickness which is, e.g., about 6 mm) along the thickness of the workpiece 2 with the above latched digital data value 77 (D), preferably at the center. The value of (a) added or subtracted from D in adjustable counters 35 and 36 may be the same or set arbitrarily different. The adjustable counters 35 and 36 deliver, as comparative data to comparators 37 and 38, respectively, the added data (D+a) and subtracted data (D−a) as the upper and lower limit values (B) and (B') for defining the bias range.

Next, assuming the digital data value of PD, which is delivered from the arithmetic unit 12 based on the spark discharge positions of the next spark discharges or sampled spark discharges after the occurrence of the discharges upon which data value 77 sets the latch or new bias range II, is the same as the data indicated by the arrow 1, the data value 1 is latched in the latching circuit by the timing pulse CP1 and output to the comparators 37 and 38 to compare with the upper and lower limit values in the newly set bias range II. Signals are delivered from both comparators 37 and 38 to the AND-gate 40 if the data value 1 is within the upper and lower limit values in the new set range II. At this time, the timing pulse CP2, slightly delayed with respect to timing pulse CP1, is output, and a signal SAME is output by AND-gate 41, indicative that the discharge position of spark pulse is within the bias range II set by the data value 77, and the signal SAME is counted by the counter 44 of the spark concentration foreseeing status detector 16. At the time of data value 1, the output from the AND-gate 40 is inverted by the invertor 43 and output to the AND-gate 42. The AND-gate 42 will not output a spark position dispersion signal OK, even if the delayed timing pulse CP2 is entered after a small delay. Thus, the data value 1 is not latched in the latching circuit 34 and there is no resetting of the bias range.

Similarly, for the subsequent spark pulses 2–11 illustrated in FIG. 10, the individual data values 2–11 are in the bias range, i.e., within the upper and lower limit values for range II, and the same circuit action as described above for signal 1 is repeated. However, since the set comparison number for the comparator 45 of the spark concentration foreseeing status detector is 6, the bias status signal SAME is output seven consecutive times from the AND-circuit 41, for the data corresponding to data values 1–7, and counted by the counter 44. Since the count of 7 exceeds the set comparason number 6, the comparator 44 delivers a foreseeing status discrimination signal SIG 1 in the nature of a warning signal, meaning that, from a bias tendency, the spark discharge position condition is likely to be slightly concentrated. This condition continues until after spark pulse 11 when new data for the next spark pulse is entered. When the data value indicated by the asterisk (*) 78 for the next spark pulse is entered, latched in the latching circuit 33, and compared with the data value 77 by the comparators 37 and 38, no signal is delivered from the AND-gate 40 because the data 78 is outside of the range II and is below the lower data limit for range II, as set in the comparators 37 and 38. The dispersion signal OK is output from the AND-gate 42 in the same manner as when the spark discharge data value 77 was entered. The count of the counter 44 is reset to cancel the spark concentration foreseeing status discrimination signal SIG 1 and to reinstate the normal control condition under the control device 7. Then, the detector prepares for detection of any bias condition for the next spark discharge position, by latching the data value 78 in the latching circuit 34 and setting new upper and lower limit values for the bias range III by means of the adjusters 35 and 36, with the data value 78 preferably at the center. In the example as illustrated in FIG. 10, after the discharge bias range III is established, the data values for the individual discharges remains within the bias range, i.e., between the upper and lower limits for more than seven discharge pulses. Therefore, the bias status detecting signal SAME is continuously counted seven or more times starting from the seventh count a spark concentration foreseeing status discrimination signal SIG 1 is again output. However, during normal machining, it is common for the spark distribution to be more random, and before counting the comparison set number, e.g., 6 or 4, of bias status detection signals in a given bias range, the discharge device operates to change the settings to a new bias range.

To summarize, according to a first preferred embodiment of the invention for the detection of a biased condition of spark discharge positions, the detection of the spark discharge positions along portions of a wire electrode defined by a pair of electrical feed members and guide members and between the workpiece and wire electrode along the axial direction of the wire electrode, i.e., along the workpiece thickness, is carried out by detecting and amplifying the current value flowing to one or both of the electrical feed members. However, for the purpose of discriminating a bias condition of the spark discharge positions, the detected spark discharge position signal, VC, is converted into digital data corresponding to information regarding the spark discharge position in the axial direction of the wire electrode. The range or ranges to which the digital data relates, the upper/lower limit of digital values of the spark discharge position bias range, is set to be small in comparison to the workpiece thickness (in the axial direction of the wire electrode). When the digital data, which is delivered upon detection of every spark discharge or sampled spark discharges, is between the upper/lower limit values of the bias range, the bias signal SAME, corresponding to a biased spark position is delivered. When the digital data value is outside the bias range, i.e., outside the range between the upper and lower limit values, a dispersion signal OK is output, and the digital values of the upper and lower limits for a new spark discharge position bias range, including the digital data value of the above spark discharge position, is set in order to prepare for the detection of any bias condition for subsequent spark discharge position digital data.

Thus, in cases where a succession of spark discharge positions between the wire electrode and the workpiece in the machining gap are concentrated essentially at a point along the wire electrode and/or on the workpiece, or if the spark discharges are biased at an arbitrary, small area along the axial direction of the wire electrode, the present invention provides the capability of detecting, and also coping with the problem. As pointed out in the abovestated '626 Laid-Open Application, as regards to compensation for the travelling speed of the wire electrode, such compensation can be achieved by continuous updating of the area to be detected, both in terms of the width and the movement of the bias range. At the same time, the spark discharge position detection signals are converted into digital data to carry out detection and discrimination, so that the distribution of discharge positions by comparative discrimination as to exact and clear areas of the wire electrode can be accomplished, and the spark conditions more precisely detected.

Another aspect of the present invention relates to improvements in the detecting accuracy of spark discharge positions. In accordance with this aspect of the invention, current flows to the wire electrode from both upper and lower sides of the workpiece are detected. The peak detected currents are held and individual maximum values of detected currents are used as position signals. The detected position signals are difference amplified and timing settings are used so that the point in time when the amplified difference signals are converted into digital data is after peak currents are held.

Yet another aspect of the present invention relates to the problem where the amplified difference between the detected current signals become zero and the spark discharge positions also coincide, but the detected current peak values are not equal due to the differences in predetermined machining conditions, particularly electrical machining parameters, such as the voltage pulse parameters. In carrying out difference amplification for both upper and lower detected position signals, digital data for correct spark discharge positions can be obtained, even if there is a change in machining conditions, by amplifying the current signals in an amplifying circuit wherein the amplification factor is varyingly regulated according to machining condition parameters, such as the voltage pulse parameters, before converting the difference amplified signals into digital data.

Another preferred embodiment of the invention relates to delivery, by the spark-status detector, of a bias status detecting signal, SAME, for classifying the spark discharge positions. The above-described preferred embodiment of the invention is designed to count every time a spark position dispersion signal OK is delivered. The spark concentration foreseeing status discrimination signal SIG 1 is delivered when the count exceeds a predetermined value. The signal SIG 1 may be used to cause a reduction in the machining load and/or to display a warning. The signal SIG 1 is input to the wire spark machining control device 7 to control and reduce the machining load. However, the second preferred embodiment of the present invention recognizes that usually a wire electrode break does not happen immediately on delivery of spark concentration bias status discrimination signal SIG 1. As described above, it is a warning indicative that the detected spark discharge positions are displaying a tendency towards a biased condition and the measure(s) or control which may be exerted to lower the machining load are limited so as to not excessively reduce machining efficiency and thereby reduce machining speed. For example, the control may be limited to slightly increasing the quiescent or off time between voltage pulses to thereby slightly lower the mean machining current; or, control may be limited to reducing the no-load voltage of the machining voltage pulses and decreasing the frequency of the spark pulses, and/or control may be limited to increasing the travelling speed of the wire electrode, and/or increasing the jet pressure and flow rate of working fluid, and/or reducing the machining feed rate. However, machining performance is maintained higher and machining permitted to continue at improved machining efficiency while preventing a wire electrode break.

DESCRIPTION OF AN ALTERNATIVE (THIRD) EMBODIMENT OF THE PRESENT INVENTION

In the event of an actual spark discharge concentration or similar condition, or a short circuit caused by some reason, including such factors as erroneous and/or unsuitable settings for various machining conditions, using only the above-described apparatus and control by the spark concentration foreseeing status discrimination signal SIG 1, the wire electrode is likely to ultimately break. A third embodiment of the invention, hereinafter described, is designed to limit the conditions which result in such breakage so that before the wire electrode breaks such conditions may be assessed using both or either of the duration time of the spark concentration foreseeing status discrimination signal SIG 1 and the state of the generation time of that signal as a break limit. Control is exerted so that the wire electrode does not break, even should an accident occur, e.g., a jet of machining fluid is stopped. Initially, control is not exerted by completely stopping machining, for example, by cutting off the supply of voltage pulses from the machining pulse power supply, but, for example, by drastically extending the quiescent or off time between voltage pulses to thereby dramatically reduce the mean machining current, or by reducing or stopping the machining feed, or, if required, by carrying out so-called backward control. Finally, if all else fails, control may involve an actual stoppage of machining.

Figure 11:
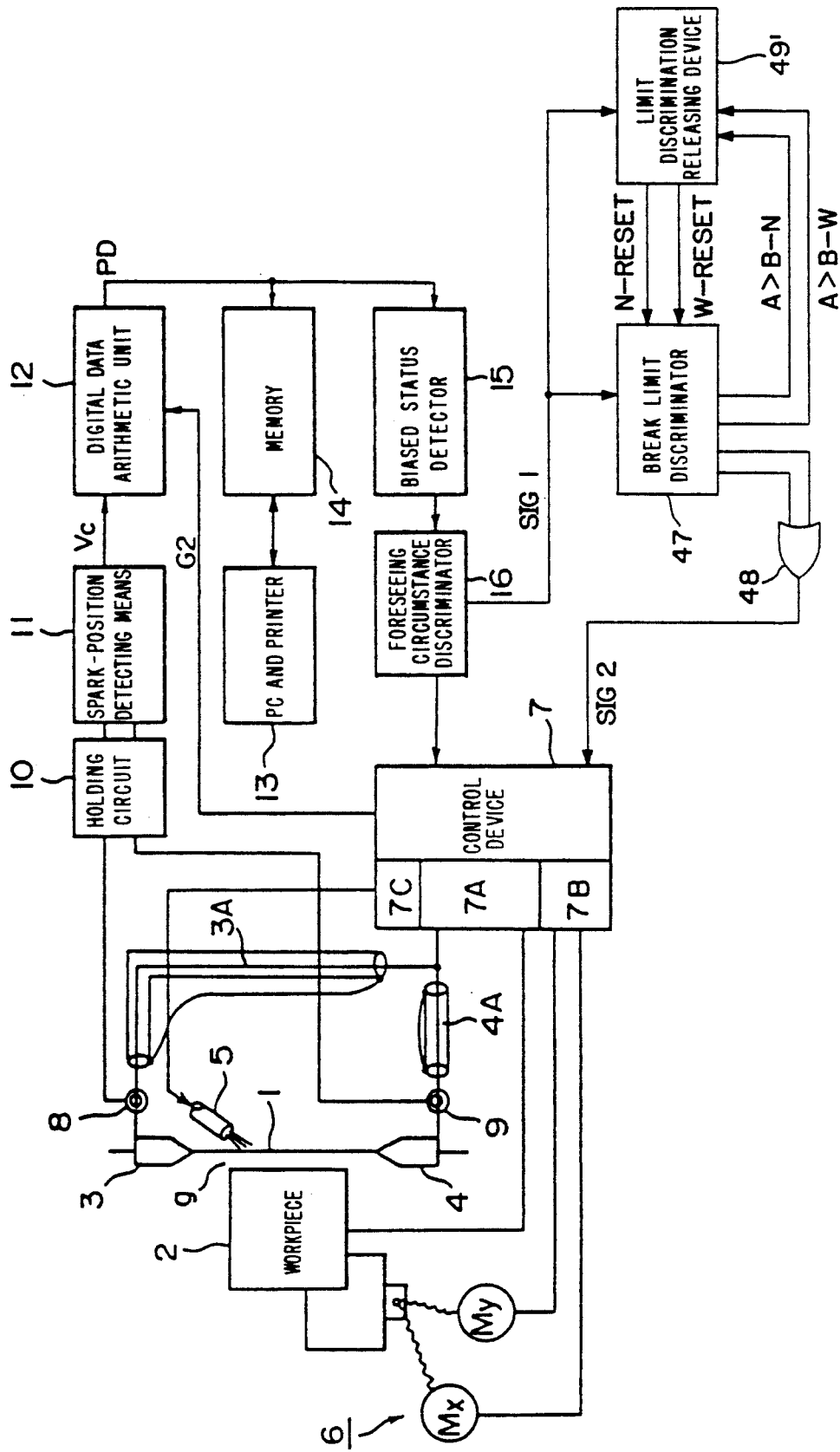
FIG. 11 is a block diagram representing the general arrangement of an embodiment which uses the third aspect of the invention.

FIG. 11 is a block diagram representing a general arrangement of a presently preferred embodiment of the above-noted alternative or third embodiment of the invention. FIG. 11 comprises the structures of FIG. 1, together with structures which comprise the third embodiment, namely, a device 47 (FIG. 12) for measuring the break limit of a wire electrode in response to the detection of the duration and the state of generation times of the discrimination signal SIG 1 from the spark concentration bias status discriminator 16 and for ultimately delivering a limit discrimination signal SIG 2 to the machining control device 7 for controlling machining conditions. This embodiment further includes release device 49' (FIG. 13) for break limit discrimination. The release device 49 detects the duration of and frequency of the generation of the discrimination signal SIG 1 in order to determine if and when, after the discriminator 47 outputs the limit discrimination signal SIG 2, the signal SIG 2 should be delivered to the control device 7. The device 48 is an OR-gate which passes the limit discrimination signal SIG 2 to the control device 7 if there is a signal output from either of two signal output terminals of the discriminator 47.

Figure 12:
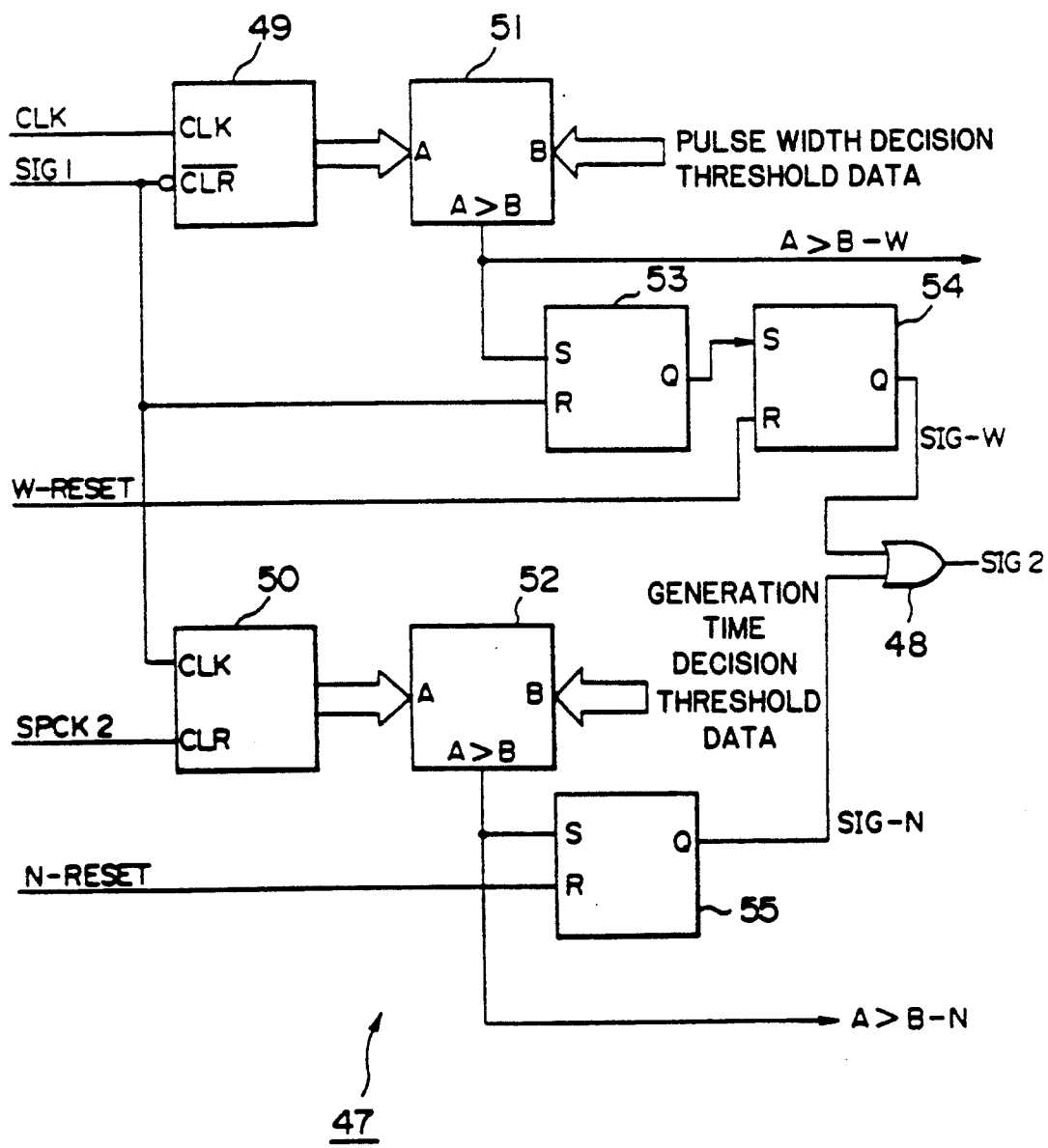
FIG. 12 is a block diagram including a specific example of a break limit discriminator 47 of FIG. 11.
Figure 13:
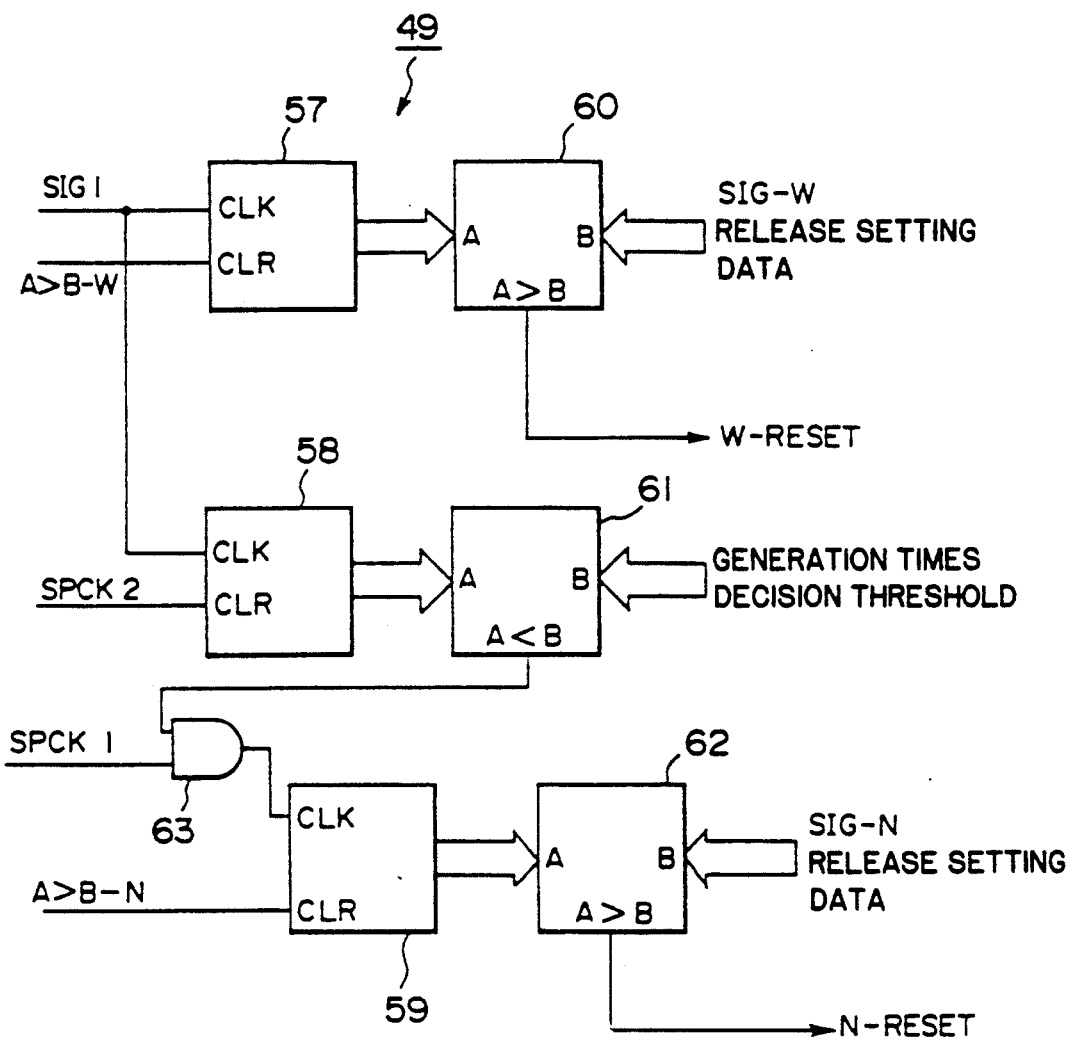
FIG. 13 is a block diagram including a specific example of a reset device 48 for the break limit discriminator of FIG. 11.
Figure 14:
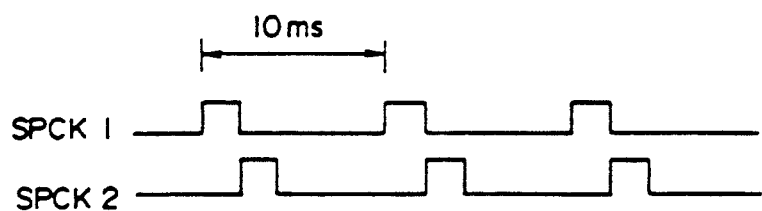
FIG. 14 is a timing chart of sampling pulses SPCK 1 and SPCK 2 in connection with the operation of the circuits of FIGS. 12 and 13.

In FIG. 12, reference numerals 49 and 50 represent counters; reference numerals 51 and 52 represent comparators; reference numerals 53, 54 and 55 represent RS flipflops; and reference numeral 56 represents an OR-gate. In FIG. 13, reference numerals 57, 58 and 59 represent counters; reference numerals 60, 61 and 62 represent comparators; reference numeral 63 represents an AND-gate. The terminal CLK on the counters depicted in FIGS. 12 and 13 is a counting terminal, e.g., for a 50 kHz clock pulse or counter pulse input; terminal CLR is an input terminal for a signal to reset or clear the count; terminal A is an input terminal for detection data relating to each comparator; terminal R is a data terminal for measuring or inputting various settings or threshold values. The signals SPCK 1 and SPCK 2 are sampling pulses periodically delivered at each required sampling time, which, in the illustrative example of FIG. 14 is 10 msec. The signal SPCK 2 is set so that after turning on signal SPCK 1, the signal SPCK 2 is delivered after a small delay (see FIG. 14).

The circuit depicted in the upper half of FIG. 12 is a section of the discriminator circuit which, when the spark concentration bias status discrimination signal SIG 1 is present, delivers a duration limit signal SIG-W from the flipflop 54 to the OR-gate 56, which in turn outputs a limit discrimination signal SIG 2 for machining condition control from the OR-gate to the control device 7, thereby signalling when the duration time range generating discrimination signal SIG 1 has reached or exceeded a desired set limit. As the threshold data to measure the pulse width of the discrimination signal SIG 1, time duration data, e.g., corresponding to 1 ms, is entered at terminal B of comparator 51. When the discrimination signal SIG 1 is output, it resets the flipflop 53 (as described above in connection with FIG. 10, bias range II) and clears the counter 49. Then, the counter 49 integrally counts clock pulses of, for example, 50 kHz, while the discrimination signal SIG 1 continues to be output. As with the discrimination signal SIG 1 in FIG. 10, bias range II, the spark dispersion signal OK is delivered in response to the fifth spark pulse after the signal SIG 1 is turned on. Afterwards, the discrimination signal SIG 1 goes a logical 0. The duration time range of the signal is about 50 μs, or thereabouts, and as long as the condition A<B exists in comparator 51, no signal (or a logical 0) is output from comparator 51. In response to the the signal SIG 1 going to a logical 0, the counter 49 resets the count and also inhibits itself so as to not count the clock pulse CLK. If the machining condition in the machining gap becomes worse for some reason, the discrimination signal SIG 1 often occurs at random and its generation duration time is more likely to become prolonged. While this situation may differ depending on predetermined machining conditions and sensitivity and mode of detection control, when the duration time range of the discrimination signal SIG 1 exceeds the threshold value set in the comparator 51 (about 1 ms in the above example and equivalent to the time during which about 100 machining pulses are supplied to and impressed across the machining gap), the discrimination signal SIG 1 is input to the counter 49 and continues to be input, without going to a logical 0 in the interim. In the present example, when the counter 49 continuously counts about 50 clock pulses CLK, the detected incoming data A in the comparator 51 will increase beyond the value of the threshold data B. As soon as an A>B relationship exists, the comparator 51 delivers an excess time length signal A>B-W to set the flipflop 53. The flipflop 53 sets the next flipflop 54. If machining continues as it is, the flipflop 54 delivers a duration limit signal SIG-W, meaning that the wire electrode 1 is at a break limit condition, and the limit discrimination signal SIG 2 for working condition control is output to the wire spark machining control device 7 to carry out appropriate control operations, e.g., a drastic reduction of machining mean current by dramatically increasing the quiescent time between voltage pulses, machining feed stop and/or backward feed. As will be understood by the artisan, such measures are exemplary only and the invention contemplates taking such measures as will prevent the wire electrode from breaking and will act so as to promote the recovery of the machining gap to a normal machining condition. In addition to the case where the duration time of the discrimination signal SIG 1 exceeds a certain level, a break of the wire electrode may occur when the frequency of occurrence of the discrimination signal SIG 1 exceeds a certain level even if no long duration time discrimination signal SIG 1 is present. The lower half of the discriminator circuit of FIG. 12 delivers a frequency of generation limit signal SIG-N from the flipflop 55 to the OR-gate 48 and a limit discrimination signal SIG 2 for machining condition control if the frequency of occurrence of the spark concentration bias status discrimination signal SIG 1 reaches and exceeds a set limit within a set time. Threshold data, used as a basis for comparison of the number of times the discrimination signal SIG 1 is output, data, e.g., corresponding to 40 times, is entered and stored in a comparator 52. The circuit is arranged so that the discrimination signal SIG 1 is input into the count terminal CLK of the counter 50 and the sampling pulse signal SPCK 2 is input into the reset terminal CLR. First, the flipflop 55 is reset. The counter 50 counts the number of times the discrimination signals SIG 1 is output during a sampling time, (e.g., =10 milliseconds), determined by the sampling pulse SPCK 2, and enters the count value into the detected data terminal A of comparator 52. The count value is compared with the predetermined data B. According to the above example, during a sampling time of 10 msec, about 10,000 machining voltage pulses are supplied to and impressed on the machining gap. If the discrimination signal SIG 1 is counted 40 or more times, that is, if the spark condition is such that the spark pulse is continuously in a predetermined bias area for 7 or more pulses and that condition is generated 40 or more times, the comparator 52 delivers an excess frequency of generation signal A>B-N and sets flipflop 55. If machining continues as it is, a limit signal SIG-N is output, meaning that the wire electrode is at a break limit condition. This results in a limit discrimination signal SIG 2 being output, as explained above.

According to the invention, wire breakage is prevented in the manner described above, and various means for machining recovery are provided. When the condition of the machining gap has recovered under control of such systems as the machining power supply 7A and/or feed drive circuit 7B through the control device 7 in response to the limit discrimination signal SIG 2, and has reached a state wherein normal, stable machining can be resumed, a condition, such as the mean voltage across the machining gap increasing above about 80 percent of no-load voltage, is detected. Thereupon, a reset pulse is input to the reset terminal R of the flipflops 54 and 55, turning off one or both of the limit signals SIG-W and SIG-N, and thereby returning to the machining conditions originally set prior to the modification of machining conditions resulting from the control exerted by SIG 2. Moreover, the present invention achieves machining recovery after control, as described above, without error and with precision by detecting probable wire breakage conditions, and by controlling those conditions and quickly causing machining recovery while maintaining machining as efficiently as possible until normal machining can be resumed, whereupon control is released.

Hereinafter, there is presented a release device 49 (FIG. 13) for break limit discrimination.

In FIG. 13, the release data for the limit signal SIG-W, data, e.g., corresponding to 100 events, is entered in the B terminal of the comparator 60, which delivers a reset signal W-RESET to the reset terminal R of the flipflop 54 (FIG. 12). The comparator 60 holds the duration limit signal SIG-W while counter 57 is arranged so that the discrimination signal SIG 1 and the excess time signal A>B-W are entered into the count input terminal CLK and the reset terminal CLR, respectively.

When setting the flipflop 53, the output of the excess duration signal A>B-W is used to set the limit signal SIG-W (FIG. 12) and also to reset the count of the counter 57 (FIG. 13). The counter 57 counts the discrimination signal SIG 1 until a new excess signal A>B-W is entered and reached. When the count from the counter 57 reaches a predetermined release count, i.e., when the count of discrimination signals SIG 1 having durations of less than 1 ms are only occasionally generated, and when no excess duration signal A>B-W, which continuously counts the number of discrimination signals SIG 1 having durations equal to or greater than e.g., 1 ms, the counter 57 is cleared and, when the condition A>B is satisfied, the comparator 60 will deliver a reset signal W-RESET. The counter 58 receives the discrimination signal SIG 1 at its count terminal CLK, and the sampling pulse SPCK 2 at its reset terminal CLR. In the comparator 61, the count data of the counter 58 is entered at input terminal A and data for predetermined threshold value for generation times, for example a data value corresponding to 10 counts, is entered at terminal B. The comparator 61 delivers a signal to a terminal of AND gate 63 when the count data A is less than the predetermined data B value, i.e., whenever A<B. The counter 59 also receives the excess frequency generation signal A>B-N at its reset terminal CLR. In the comparator 62, the count data of the counter 59 is entered at terminal A and release data for the limit signal SIG-N, data, for example, a data value corresponding to 5 counts, is entered at input terminal B. The comparator 62 delivers a reset signal N-RESET, to the reset terminal R of the flipflop 55 (FIG. 12). Therefore, when the counter 58 does not count discrimination signals SIG 1 to a count which exceeds the data value set in the comparator 61, within a short time, e.g., about 10 msec, after the sampling pulse SPCK 2 (which delivers a reset signal to the counter 58) the sampling pulse SPCK 1 is gated to the counter 59 through the AND gate 63. When this state continues without generation of an excess frequency of generation signal A>B-N, the counter 59 will continue to count up. When the count A in comparator 62 reaches or exceeds the release data value B, the reset signal N-RESET is output. This circuit operates to reset and extinguish the set and hold of the frequency of generation limit signal SIG-N when machining conditions are such that no excess frequency of generation signal A>B-N is detected for a preset time. However, if the detection of the discrimination signal SIG 1 is likely to be more frequent than normal, the AND gate 63 blocks or inhibits count pulses to thereby delay the output of the reset signal N-RESET, even where no excess frequency of generation signal A>B-N is detected Further, the usefulness and the effect of a wire cut electrical discharge machining apparatus having a wire break-prevention means for the wire electrode and provided with the above break limit discriminator 47 and its release device 49 are apparent from the description above.

We claim:

1. A detection system for a wire cut electrical discharge machining apparatus including a renewable wire electrode movable in its axial direction through a working zone in which a workpiece to be machined is adapted to be disposed, said wire electrode being held under tension and during machining in contact with upper and lower electrical feed members, said upper and lower electrical feed members being disposed on opposite sides of the working zone, said workpiece and said wire electrode, during machining, forming a working gap across which machining pulses are impressed in order to produce spark discharges between said wire electrode and said workpiece, said detection system comprising:

a current detector means for detecting a spark current flowing into at least one of said electrical feed members;

a spark position detecting means for amplifying the detected current and generating a signal corresponding to a spark discharge position, along the axial direction of the wire electrode between said upper and lower electrical feed members;

a digital data arithmetic unit for converting the output signal from said spark position detecting means into digital data corresponding to said spark discharge position;

a spark status detector responsive to said digital data for generating a spark discharge bias signal when the digital data output by said digital data arithmetic unit is within a bias range established by an upper limit value and a lower limit value and for delivering a spark position dispersion signal when the digital data output by said digital data arithmetic unit is outside said bias range and for resetting the upper and lower limit values for a new spark discharge position bias range based on a detected spark discharge position.

2. The detection system according to claim 1, wherein said upper limit value and lower limit value define a bias range which is small in comparison with said workpiece thickness.

3. The detection system according to claim 1, wherein a digital data value for a spark discharge position is generated for each spark discharge.

4. The detection system according to claim 1, wherein said spark position detecting means further comprises means, responsive to machining conditions, for adjusting said output signal.

5. The detection system according to claim 1, wherein a digital value for a spark discharge position is generated for a sampling of spark discharges.

6. The detection system according to claim 5, wherein said spark position detecting means includes means for amplifying the difference between the output signals of said current detectors, and wherein means for adjusting comprises means for varying the amplification factor of said amplifying means in accordance with machining conditions.

7. The detection system according to claim 1, wherein said current detector means comprises upper and lower current detectors associated with said upper and lower electrical feed members respectively, said system further comprising upper and lower peak holding circuits for detecting and holding the peak current values detected by the upper and lower current detectors and a spark position detecting means for extracting a difference between peak current values held by said upper and lower peak holding circuits to thereby output a signal corresponding to a spark discharge position.

8. The detection system according to claim 7, further comprising means for generating a timing signal, said digital data arithmetic unit being responsive to said timing signal for generating said position signal after said peak current value is held by said peak holding circuits.

9. The detection system according to claim 7, wherein said spark position detecting means comprises a difference amplifier and further comprising means for generating a signal to reset said spark position detecting means.

10. The detection system according to claim 9, wherein said machining apparatus further comprises a power supply circuit having a switching means responsive to a gating pulse (G2) and said system further comprises means responsive to said gating pulse for generating a timing signal (A/D CLK) having a start time generally coincident with the termination of said gating pulse, said timing signal being input to said digital data arithmetic unit, whereby a spark discharge position signal is output for each spark discharge.

11. The detection system according to claim 10, further comprising means for variably amplifying said spark positional signal in accordance with predetermined working conditions.

12. The detection system according to claim 11, wherein said variable amplifying means comprises a difference amplifier having a variable amplification factor, and further comprising means for resetting said amplification factor in accordance with machining conditions.

13. The detection system according to claim 12, wherein aid resetting means comprises a feedback loop for varying the amplification factor of said difference amplifier, said feedback loop including means responsive to machining conditions to reset said amplification factor.

14. The detection system according to claim 9, wherein the output of said difference amplifier is input to said digital data arithmetic unit to convert said digital data into a spark discharge position, and wherein said difference amplifier has a variable amplification factor.

15. The detection system according to claim 14, wherein said amplification factor varies inversely with respect to predetermined machining parameters.

16. The detection system according to claim 15, wherein said predetermined parameters include machining voltage and machining pulse width.

17. A spark discharge status detection system for a wire cut electrical discharge machining apparatus having a working zone in which a workpiece to be machined is adapted to be positioned, a wire electrode adapted to be fed in its axial direction through said working zone, said wire electrode being held under tension and in contact with an upper and lower electrical feed member as it passes through said working zone, said upper and lower electrical feed members being positioned on opposite sides of said working zone, said workpiece and wire electrode forming therebetween a working gap across which electrical discharges occur during machining, said spark discharge status detection system comprising:
- a current detection means for detecting the current flowing through said upper and lower electrical feed members;
- a spark position detection means for amplifying the detected current from said upper and lower electrical feed members and outputting a signal corresponding to a spark discharge position;
- a digital data arithmetic unit for converting the spark discharge position signals into digital data;
- a spark status detector, responsive to said digital data, for generating a spark discharge position bias signal when the digital data output by the digital data arithmetic unit is within a bias range established by an upper limit value and a lower limit value, means for adding and subtracting digital data to digital data representative of the upper limit value and lower limit value to thereby establish a new bias range, means for generating a first logic signal when the digital data for a spark discharge position is within said bias range and for generating a second logic signal when said digital data for a spark position is outside of said bias range, means, responsive to said first and second logic signals, for resetting said upper and lower limit values.

18. The spark discharge status detection system according to claim 17, wherein said bias range is small in comparison to the thickness of said workpiece.

19. The spark discharge status detection system according to clam 17, wherein a spark position signal is generated for each spark discharge.

20. The spark discharge status detection system according to claim 17 wherein a spark position signal is generated for sampled spark discharges.

21. The spark discharge status detection system according to claim 17, wherein said means for adding and subtracting comprises a digital adder and a digital subtractor.

22. The spark discharge status detection system according to claim 21, wherein said bias range is established by reference to a spark discharge position.

23. The spark discharge status detection system according to claim 21, further comprising comparators for comparing spark position digital data from said digital data arithmetic unit with said upper and lower limit values.

24. The spark discharge status detection system according to claim 23, further comprising a timing means for generating a timing pulse, delayed with regard to a machining pulse gate signal, to said means for generating said first and second logic signals.

25. The spark discharge status detection system according to claim 17, further comprising means for outputting a control signal (SIG 1) whenever a condition, indicative of a wire break condition, is sensed.

26. The spark discharge status detection system according to claim 25, wherein said control signal is operable to increase the off time of the machining pulses.

27. The spark discharge status detection system according to claim 25, wherein said control signal is operable to decrease the mean value of machining current.

28. The spark discharge status detection system according to claim 25, wherein said control signal is operable to display a warning.

29. The spark discharge status detection system according to claim 24, wherein said means for adding and subtracting comprises first and second adjustable counters for setting said upper and lower limit values, said apparatus further comprising first and second latching circuits for receiving the digital data from the digital data arithmetic unit and first and second comparators for comparing spark discharge position data from said first and second latching circuits, respectively, with the upper and lower bias limit values from said first and second adjustable counter, respectively.

30. The spark discharge status detection system according to claim 29, wherein said means for generating first and second logic signals further comprises a logic circuit for receiving an output from said first and second comparators.

31. The spark discharge status detection system according to claim 30, further comprising a broken wire electrode discriminator, responsive to said first and second logic signals for generating a control signal (SIG 1).

32. The spark discharge status detection system according to claim 31, wherein said broken wire electrode discriminator further comprises a counter for counting the number of said first logic signals and a comparator for comparing said count with an adjustable, preselected value and outputting said control signal whenever said count value exceeds said adjustable, preselected value.

33. The spark discharge status detection system according to claim 32, wherein said control signal (SIG 1) is operable to reduce the machining load of said electrical discharge machining apparatus.

34. The spark discharge status detection system according to claim 32, wherein said control signal (SIG. 1) is operable to display a wire break warning.

35. The spark discharge status detection system according to claim 31, further comprising a break limit discriminator, responsive to said control signal (SIG 1) for generating a second control signal (SIG. 2) indicative of conditions wherein said wire electrode is likely to break.

36. The spark discharge status detection system according to claim 35, wherein said break limit discriminator is further responsive to the duration of said control signal (SIG 1).

37. The spark discharge status detection system according to claim 36, wherein said break limit discriminator includes means for detecting the duration time of said control signal and for generating a time limit signal (SIG-W) whenever said duration time exceeds a set limit.

38. The spark discharge status detection system according to claim 31, wherein, upon the generation of said time limit signal (SIG-W), said second control signal (SIG 2) is output to a control system for controlling said electrical discharge machining apparatus to prevent breakage of said wire electrode.

39. The spark discharge status detection system according to claim 38, further comprising means for generating a reset signal (W-RESET) for turning off said time limit signal (SIG-W) when machining conditions no longer indicate imminent wire breakage.

40. The spark discharge status detection system according to claim 39, wherein said means for generating said reset signal (W-RESET) comprises a counter for counting the number of said control signals (SIG 1) generated prior to generation of an excess duration signal, and a comparator for comparing said count with a predetermined release value and for generating said reset signal when said count exceeds said release value.

41. The spark discharge status detection system according to claim 35, wherein said break limit discriminator is further responsive to the frequency of generation of said control signal (SIG 1) for generating said second control signal (SIG 2).

42. The spark discharge status detection system according to claim 47, wherein said break limit discriminator further comprises means, responsive to said control signal (SIG 1) for generating a frequency of occurrence signal (SIG-N) whenever the frequency of occurrence of said control signal exceeds a set frequency.

43. The spark discharge status detection system according to claim 42, wherein, upon generation of said frequency of occurrence signal (SIG-N), said second control signal (SIG 2) is output to a control system for controlling said electrical discharge machining apparatus to prevent breakage of said wire electrode.

44. The spark discharge status detection system according to claim 43, further comprising means for generating a release signal (N-RESET) for turning off said frequency of occurrence signal (SIG-N) when machining conditions no longer indicate imminent wire breakage.

45. The spark discharge status detection system according to claim 44, wherein said means for generating said release signal (N-RESET) comprises means for generating a signal (A>B-N) indicative of an excess frequency of generation of said control signal (SIG 1) and for generating said release signal (N-RESET) when no excess frequency of generation signal is present for a preset time.

* * * * *